United States Patent
Slifka et al.

(10) Patent No.: US 10,163,436 B1
(45) Date of Patent: Dec. 25, 2018

(54) TRAINING A SPEECH PROCESSING SYSTEM USING SPOKEN UTTERANCES

(71) Applicant: Amazon Technologies, Inc., Seattle, WA (US)

(72) Inventors: Janet Louise Slifka, Cambridge, MA (US); Elizabeth Baran, Boston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/278,190

(22) Filed: Sep. 28, 2016

(51) Int. Cl.
| | |
|---|---|
| *G10L 15/26* | (2006.01) |
| *G10L 15/06* | (2013.01) |
| *G10L 13/08* | (2013.01) |
| *G10L 15/30* | (2013.01) |
| *G10L 15/22* | (2006.01) |
| *G10L 15/18* | (2013.01) |

(52) U.S. Cl.
CPC ............ *G10L 15/063* (2013.01); *G10L 13/08* (2013.01); *G10L 15/1822* (2013.01); *G10L 15/22* (2013.01); *G10L 15/30* (2013.01); *G10L 2015/0635* (2013.01); *G10L 2015/223* (2013.01)

(58) Field of Classification Search
CPC ...... G06F 17/28; G10L 15/22; H04N 5/44543
USPC .................................... 704/1–10, 230–270.1
See application file for complete search history.

(56) References Cited

U.S. PATENT DOCUMENTS

| | | | |
|---|---|---|---|
| 6,415,257 B1* | 7/2002 | Junqua | H04N 5/44543 348/E5.105 |
| 9,009,046 B1* | 4/2015 | Stewart | G10L 15/18 704/251 |
| 2006/0149555 A1* | 7/2006 | Fabbrizio | G10L 15/22 704/275 |
| 2017/0169013 A1* | 6/2017 | Sarikaya | G06F 17/28 |

\* cited by examiner

*Primary Examiner* — Huyen Vo
(74) *Attorney, Agent, or Firm* — Pierce Atwood LLP

(57) ABSTRACT

Systems, methods, and devices for training a Natural Language Understanding (NLU) component of a system using spoken utterances of individuals are described. A server sends a device, such as a speech-controlled device, a signal that causes the device to output audio soliciting content regarding how a user would speak a particular command for execution by a particular application. The device captures spoken audio and sends it to the server. The server performs speech processing on received audio data to parse the audio data into multiple portions. The server then associates a first portion of the audio data with a command indicator and a second portion of the audio data with a content indicator. The associated data is then used to update how the NLU component determines how utterances triggering the command are spoken.

17 Claims, 17 Drawing Sheets

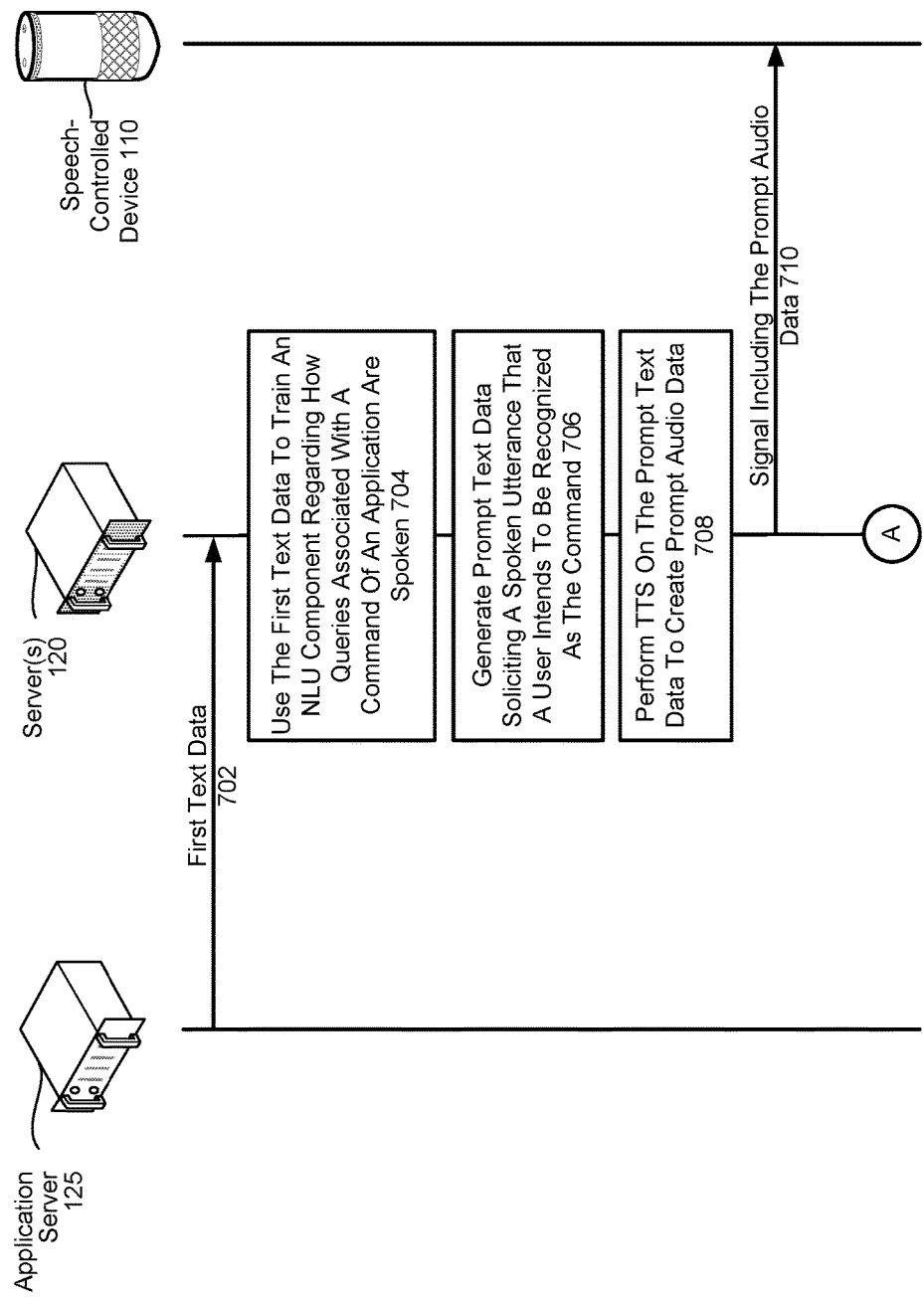

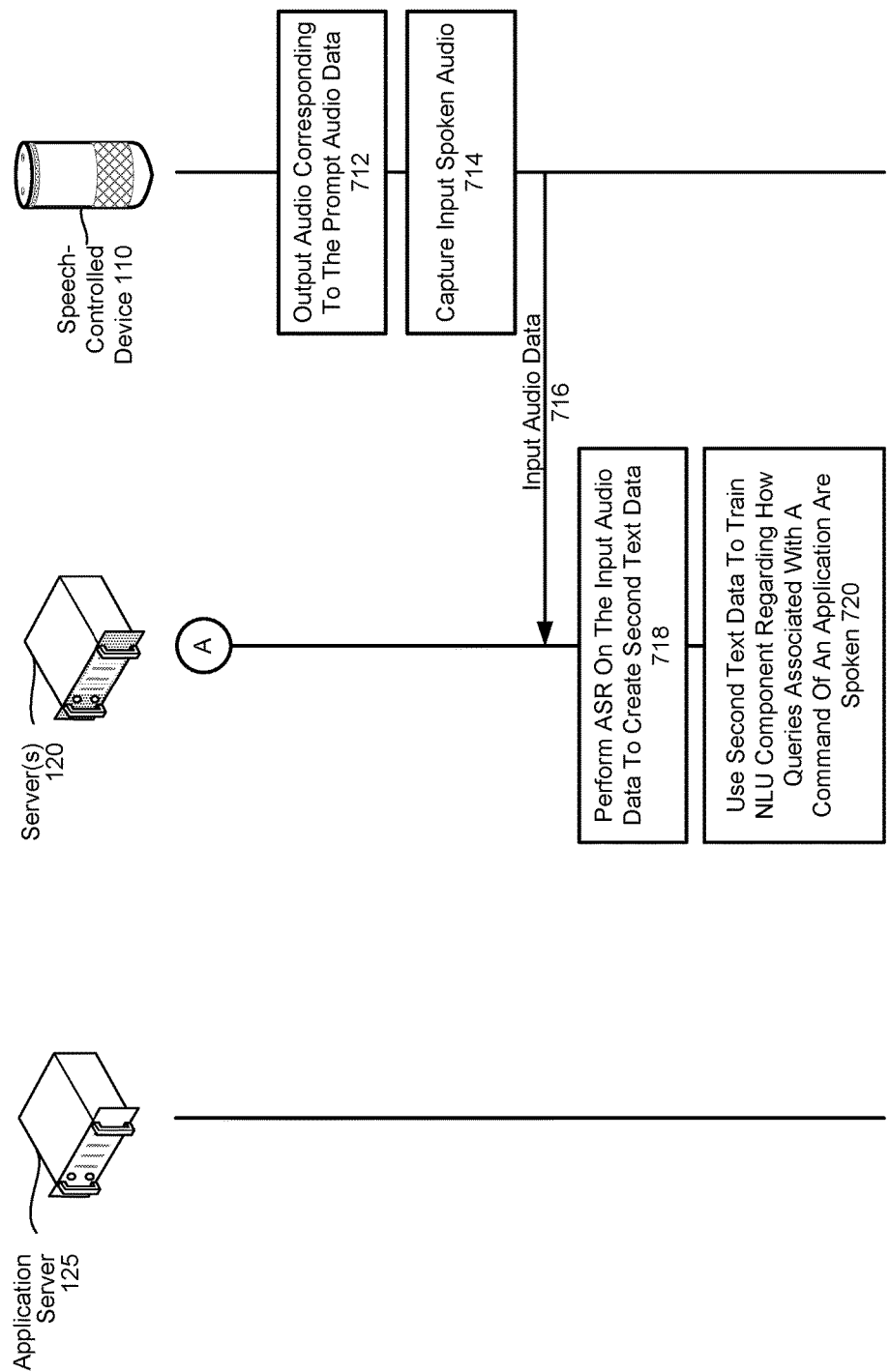

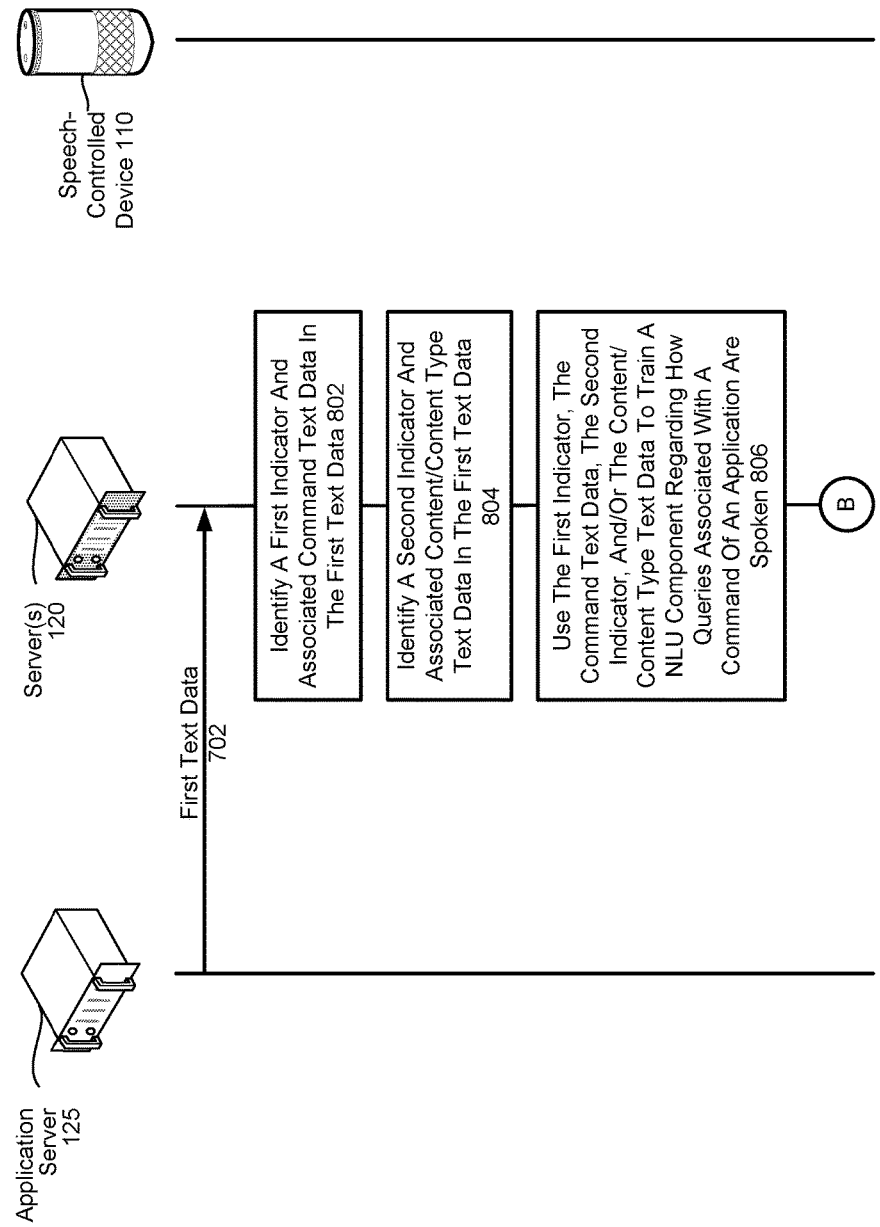

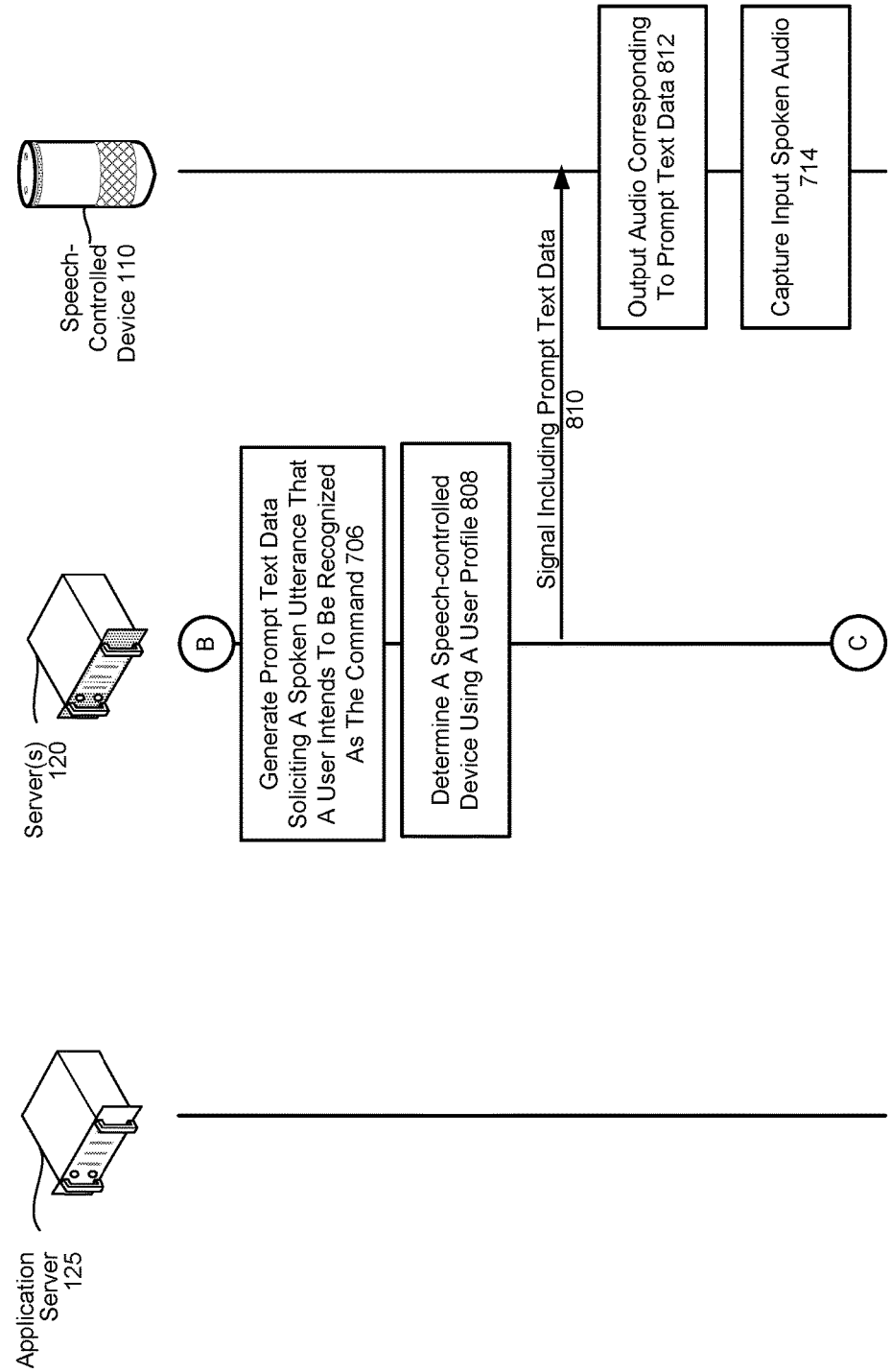

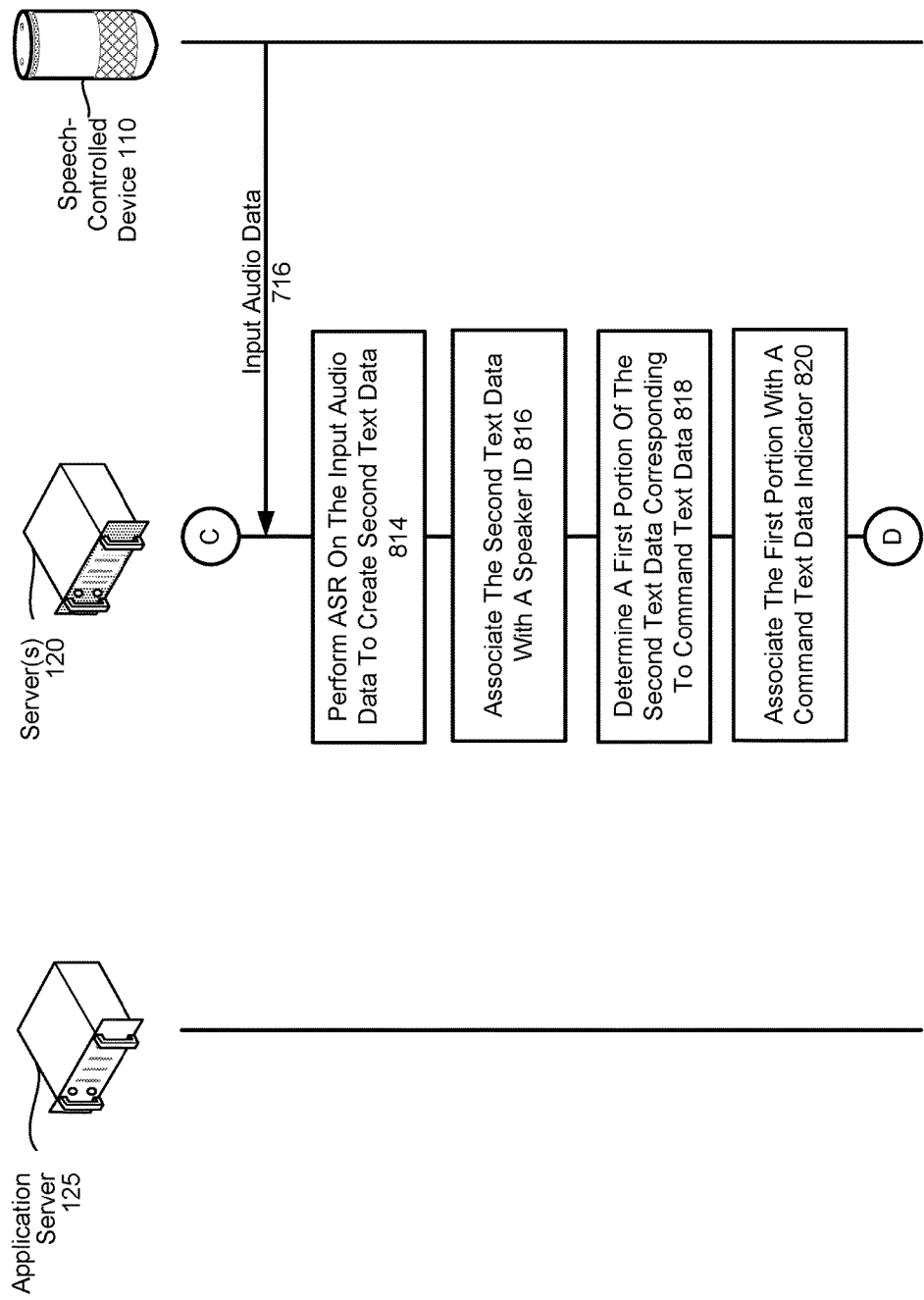

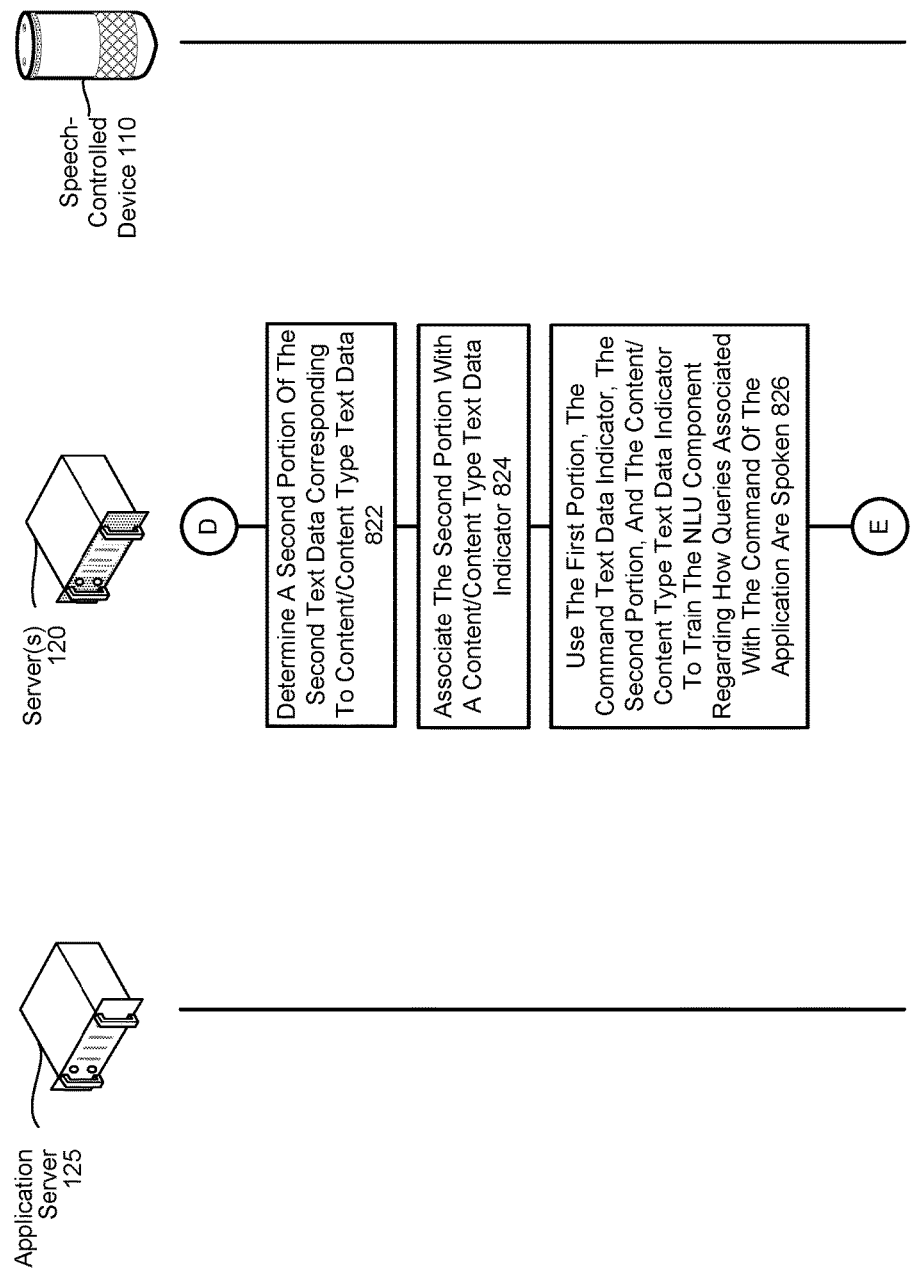

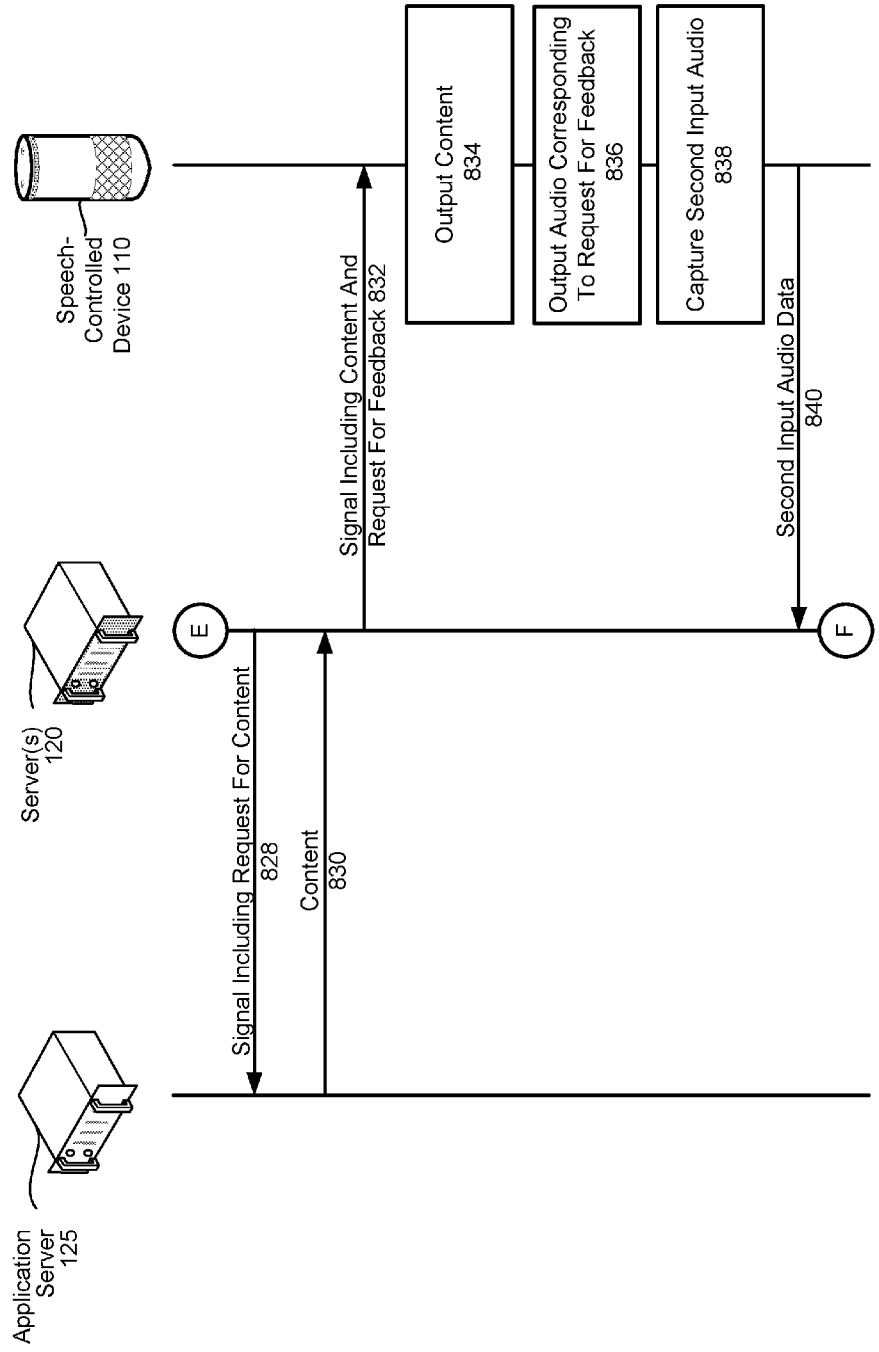

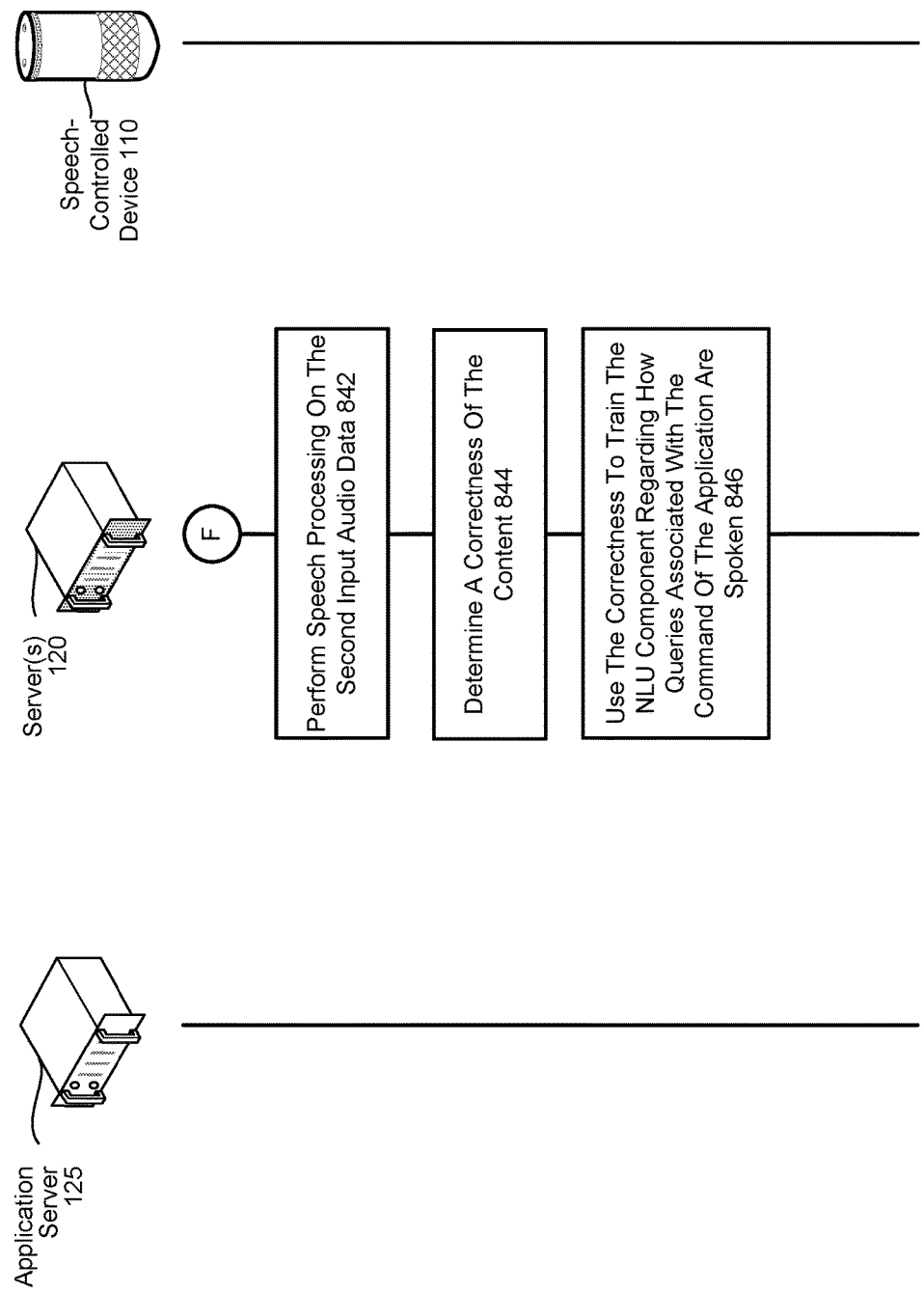

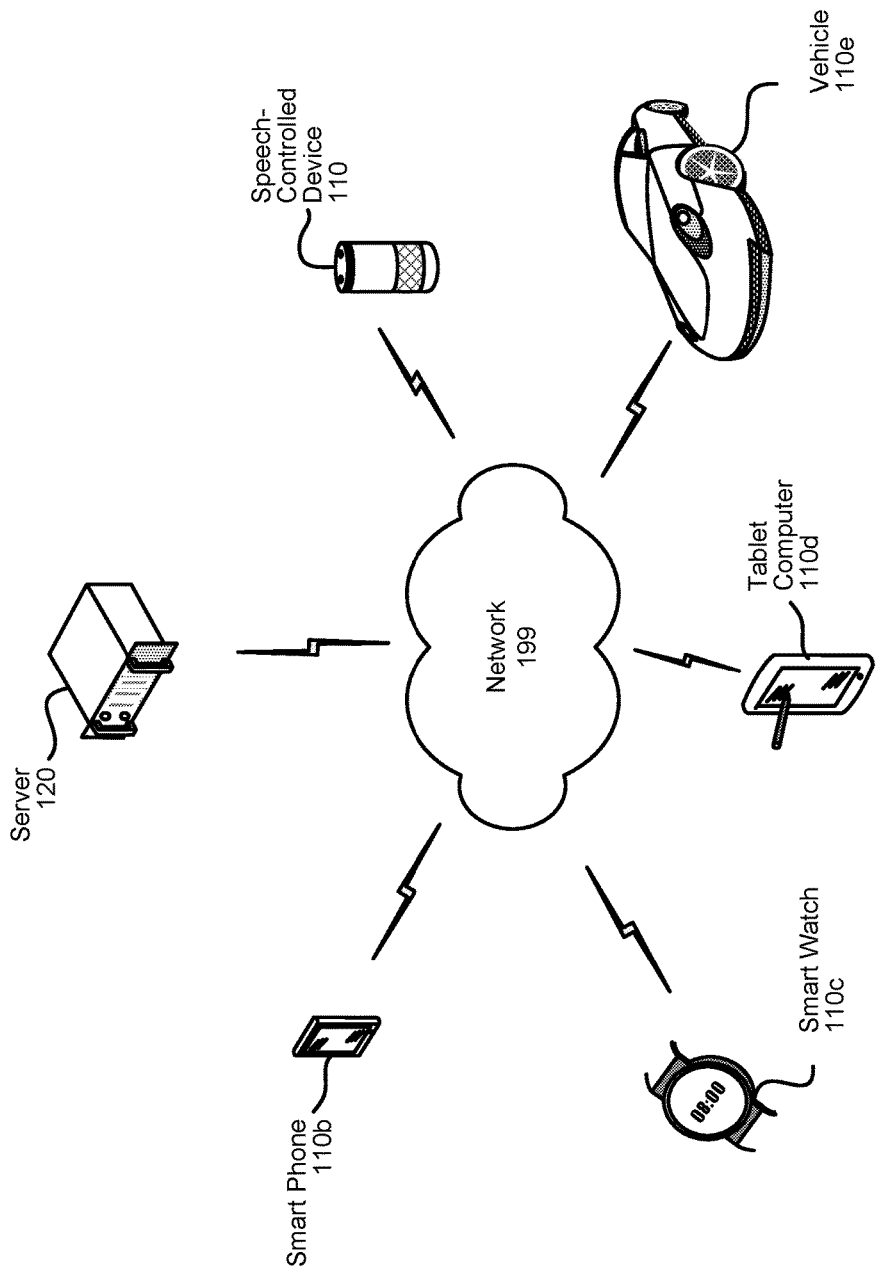

TRAINING A SPEECH PROCESSING SYSTEM USING SPOKEN UTTERANCES

BACKGROUND

Speech recognition systems have progressed to the point where humans can interact with computing devices by relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 7A and 7B are a system flow diagram illustrating the training of a NLU component of a speech processing system using spoken utterances according to embodiments of the present disclosure.

FIGS. 8A through 8F are a signal flow diagram illustrating the training of a NLU component of a speech processing system using spoken utterances according to embodiments of the present disclosure.

FIG. 11 illustrates an example of a computer network for use with the system of the present disclosure.

DETAILED DESCRIPTION

Figure 1:
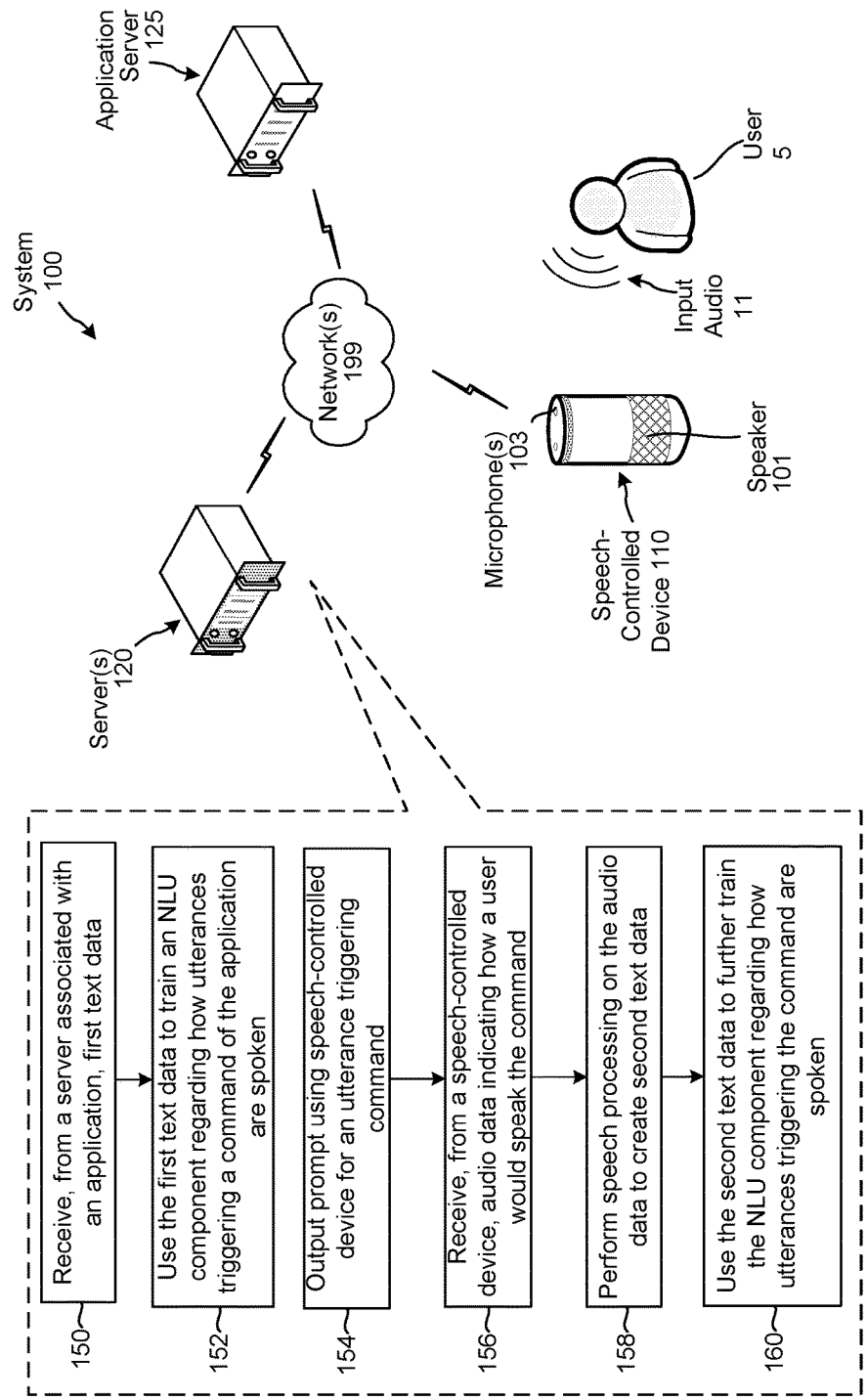
FIG. 1 illustrates a system for training a natural language understanding (NLU) component of a speech processing system using spoken utterances according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Speech processing systems process spoken audio to determine, and often execute, an intended command of the user's utterance. Each speech processing system may have its own rigid structure that spoken utterances must conform to in order for the spoken utterance to be correctly recognized and processed by an NLU component. For example, a speech processing system may require a certain verb and certain nouns be presented in a certain order for the speech processing system to correctly recognize the spoken utterance as requesting a particular action relating to particular content. Nonetheless, users may inevitably speak utterances, intended to trigger commands, in formats not recognized by the speech processing system. This may be a result of various factors including natural variance in users' particular speech patterns, uses of colloquialisms, preferred method of speaking commands, or the like. For example, this may occur if the speech processing system's utterance structure is configured to comply with speech parlance corresponding to a first location (e.g., a first continent), but the system has users at locations other than that which the utterance structure is configured for. This problem may be exacerbated by the fact that the rules and models designed to perform NLU processing may be based on sample utterances that may not fully take into account the various use configurations the speech processing system may encounter during actual runtime.

In order to solve these and other problems, the present disclosure provides a speech processing system including a dynamic NLU component that enables variable utterance structures. That is, the presently disclosed system can receive input utterances in various forms, store audio and/or text data corresponding to those utterances, and then retrain speech processing models/components based on the input utterances. To obtain the utterances that the system will use to retrain speech processing components, the system may solicit a user to speak a particular utterance (for example, an utterance asking for a command to be executed for a specific application). The system processes the speech, and uses the speech to train one or more NLU components to understand various ways in which the utterance may be spoken. In an example, spoken utterances used to train the NLU component may be in different languages, thus allowing the system to learn how a user may speak a particular command in another language. This results in a robust platform that may recognize spoken utterances in various forms and languages.

For example, if a system is configured to be able to perform a command such as playing a video from a video service such as Amazon Instant Video, it may output a prompt to a user such as "tell me how you'd like to launch a video from Amazon Instant Video." The system may then, in response to the prompt, receive utterance audio data from a device associated with the user. The system may perform speech processing on the audio data and may store the resulting text and/or utterance audio data. The system may associate the text/audio data with the command that the user was prompted to give (e.g., play video with Amazon Instant Video) and may later use the text/audio data to retrain the system to more easily recognize commands in the way the user framed them.

In another example, the system may prompt the user to speak utterances, even without a command-specific prompt. For example, the system may prompt the user with "say something you'd like me to be able to do." The system may then, in response to the prompt, receive utterance audio data from a device associated with the user. The system may perform speech processing on the audio data and may store the resulting text and/or utterance audio data. The system may store the resulting text/audio data for use in retraining the system to more easily recognize commands in the way the user framed them.

FIG. 1 shows a system 100 configured to train a NLU component of the system using spoken utterances. Although FIG. 1, and lower figures/discussion, illustrate the operation of the system 100 in a particular order, the steps described may be performed in a different order, as well as certain steps removed or added, without departing from the intent of the disclosure. As shown in FIG. 1, the system 100 may include one or more speech-controlled devices 110 local to a user 5. The system 100 also includes one or more networks 199, one or more servers 120, and one or more application servers 125 connected to the device(s) 110 across network(s) 199. The server(s) 120, which may be one or more different physical devices, may be capable of performing traditional speech processing, such as ASR, NLU, utterance parsing, etc. as described herein. A single server 120 may be capable of performing all speech processing or multiple servers 120 may combine to perform the speech processing. Further, the server(s) 120 may be configured to execute certain commands, such as answering utterances spoken by the user 5. In addition, certain speech detection or command execution functions may be performed by the device(s) 110.

As shown in FIG. 1, a server 120 may be in communication with an application server 125. In one embodiment the application server 125 may be operated by the same system as server 120. In another embodiment, the application server 125 may be operated by a system different from the system 100. In such an embodiment, the application server 125 may have access to content not provided for by the system 100. For example, the server 120 may be capable of performing speech processing and executing certain commands (such as playing music and playing video) but the application server 125 may not be capable of performing speech processing but may be capable of executing other commands such as ordering food, ordering a taxi, or the like. The server 120 and application server 125 may thus work together to perform speech processing and execute commands.

At some point in time, for example during system configuration, the server 120 may receive (150) text data from the application server 125. The text data provided by the application server 125 to the server 120 may be illustrative text that conforms to the system's default utterance structure. As such, the server 120 may use (152) the text data provided by the application server 125 to train an NLU component of the system 100. Such training may configure the NLU component to recognize at least a portion of the text data provided by the application server 125 as being associated with the application server 125. Hence, subsequent processing of a spoken utterances including content corresponding to the text data provided by the application server 125 may cause the server 120 to communicate with the application server 125. As an example, if the application server 125 is configured to order food, it may provide the server 120 with indications of the kinds of text data the server 120 might associate with a food order, and thus what utterance content may be expected in an utterance that is ordering food.

With information about the kinds of words associated with a command of the application server 125, the server 120 may, at a later time, solicit one or more utterances from user(s) speaking the command. The server may then associate those utterances with the text data and update its speech processing capabilities. Thus, as further shown in FIG. 1, the server may output (154) a prompt using speech-controlled device 110, where the prompt asks the user to speak an utterance triggering the command.

The prompt may include the output of audio and/or visual content. For example, the system 100 may output, via a display (not illustrated) associated with the same user profile (described herein below) as the speech-controlled device 110, an image or video. The display may be integrated in or separate from the speech-controlled device 110. Contemporaneously therewith, the system 100 may output, via a speaker 101 of the speech-controlled device 110 or a different speaker, audio stating "Tell me how you would refer to this." In this manner the system may process the user's response and link the response to data regarding the object in the image.

The prompt may also solicit information specific to the user (e.g., by asking "What city are you in," "When was the city founded," etc.), thereby enabling the system 100 to supplement its information regarding the user or its knowledge base generally. Further, prompts may solicit data based on previous system performance in executing commands. For example, if the system did not previously have data sufficient to execute a command, the system may generate a prompt soliciting data specific to that command. Prompts may also be generated based on external stimuli (e.g., based on what data a party external to the system 100 wants gathered, such as an application developer soliciting example utterances or other data). The server 120 may then cause the speech-controlled device 110 to output audio corresponding to the prompt soliciting a spoken utterance corresponding to how a user would solicit content from the application server 125, without consideration of the system's default utterance structure (e.g., in normal communication parlance). The output audio may be generated using text-to-speech (TTS) techniques such as those described below.

Following output of the output audio, the speech-controlled device 110 may capture spoken audio 11 via a microphone 103 of the speech-controlled device 110. The spoken audio 11 may be in response to the output audio prompt. The speech-controlled device 110 may then send audio data corresponding to the spoken audio 11 to the server 120 for processing. Alternatively, a microphone array (not illustrated) may capture the spoken audio 11. In an example, the microphone array is in direct communication with the speech-controlled device 110 such that when the microphone array captures the spoken audio 11, the microphone array sends audio data corresponding to the spoken audio 11 to the speech-controlled device 110. In another example, the microphone array is in indirect communication with the speech-controlled device 110 via a companion application of a mobile computing device (not illustrated), such as a smart phone, tablet, laptop, etc. In this example, when the microphone array captures the spoken audio 11, the microphone array sends audio data corresponding to the spoken audio 11 to the companion application, which forwards the audio data to the speech-controlled device 110. Upon receiving the audio data from the microphone array, the speech-controlled device 110 may forward the audio data to the server 120 for processing. In yet another example, the microphone array is in indirect communication with the server 120 via the companion application such that when the microphone array captures the spoken audio 11, the microphone array sends audio data corresponding to the spoken audio 11 to the companion application, which forwards the audio data to the server 120 for processing.

The server 120 may receive (156), from either the speech-controlled device 110 or a companion application, audio data corresponding to an utterance spoken by the user indicating how the user 5 would speak the command. It should be appreciated that the term "command" used herein includes, but is not limited to, a directive for a system to execute a function. For example, the spoken utterance may simply include information corresponding to an organization of the spoken utterance (e.g., what language is being spoken, etc.) and/or information related to specific content (e.g., the user may speak an object such as "pizza," "Florida," etc.). The utterance may take any number of different forms (e.g., may be in a form different from the system's default utterance structure). For example, if the server prompts the user to say how the user would speak a command to play music, the user may phrase the command in any manner the user desires (such as "spin some tunes," "blast some rock," or the like) which may be different from how the system expects to receive a command to play music (e.g., "play Adele's new album"). The server 120 may perform (158) speech processing (e.g., ASR) on the received audio data to create text. The server 120 may then use (160) the created text to further train the NLU component regarding how spoken utterances triggering the command associated with the application server 125 are spoken by users. That is, the created text may be used by the NLU component to refine the default utterance structure of the utterance that triggers the command associated with the application to be more accurate in view of commonplace user speech patterns. Such refinement may be on a language level. For example, if the default utterance structure is specific to a first language (e.g., English), and subsequent spoken utterances are in languages other than the first language, the utterance structure may be updated such that the NLU component can recognize utterances in the additional languages. Alternatively, if a spoken utterance is in a different language than that originally used to train the NLU component, the spoken utterance in the different language may be used to train a second, different NLU component. Each command capable of being processed by the NLU component may be associated with a separate utterance structure. As such, according to the previous example, not only can the NLU component be trained to recognize utterances in various languages, the NLU component may be trained to recognize particular command utterance structures in particular languages.

It should be appreciated that the spoken utterance may be used to retrain an ASR component of the system instead of or in addition to retraining the NLU component. For example, retraining the ASR component may be beneficial when the spoken utterance includes a language that the ASR component was not previously trained to process.

In some implementations, the system 100 may be configured to receive audio data including a wakeword portion and a payload. A wakeword is content that, when detected by a device, wakes the device from a sleep mode to a runtime mode. In an example, when a speech-controlled device 110 detects a spoken wakeword, the device 110 may thereafter capture audio for a threshold amount of time. The threshold amount of time should be an amount of time sufficient to capture a spoken utterance including a command. The threshold amount of time may be different depending upon implementation. It should be appreciated that a spoken utterance may be used to train a NLU and/or ASR component with respect to how a wakeword is spoken, without departing from the present disclosure.

In another example, the system may prompt the user in a more unstructured manner, for example asking the user to speak an utterance that the user desires the system to understand. The audio and/or text of such an utterance may be stored and processed by the system to improve the system's speech capabilities. In such circumstances, the system may use spoken utterances to train entity resolution/gazetteer processing as described herein.

Figure 2:
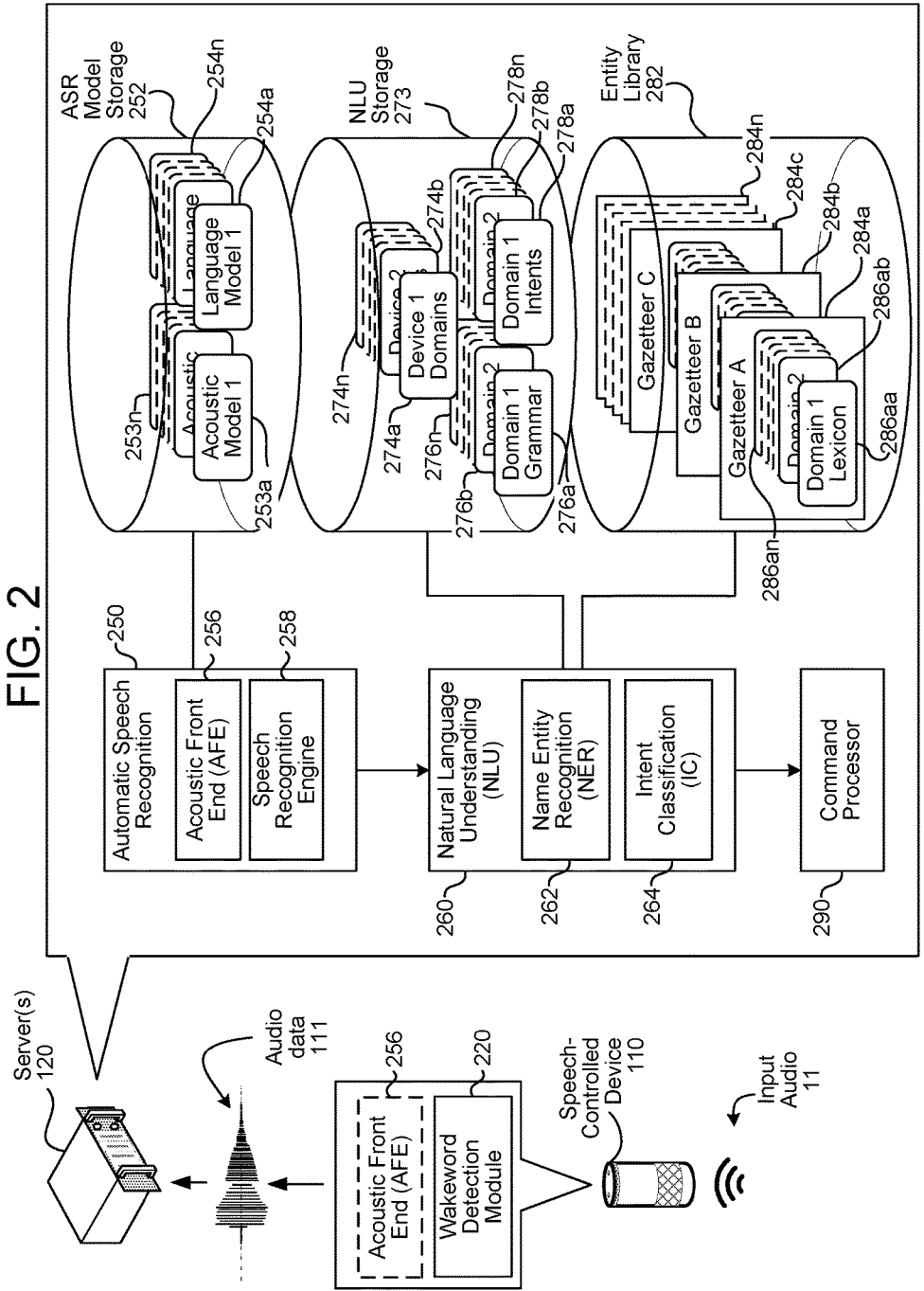
FIG. 2 is a conceptual diagram of a speech processing system according to embodiments of the present disclosure.

Further details of training the NLU component of the speech processing system using spoken utterances are explained below, following a discussion of the overall speech processing system of FIG. 2. The system 100 of FIG. 1 may operate using various speech processing components as described in FIG. 2. FIG. 2 is a conceptual diagram of how a spoken utterance is processed. The various components illustrated may be located on a same or different physical devices. Communication between various components illustrated in FIG. 2 may occur directly or across a network 199. An audio capture component, such as a microphone 103 of a speech-controlled device 110 (or other device), captures audio 11 corresponding to a spoken utterance. The device sends audio data 111 corresponding to the utterance, to an ASR module 250. The audio data 111 may be output from an acoustic front end (AFE) 256 located on the device 110 prior to transmission. Alternatively, the audio data 111 may be output in a form for processing by a remote AFE 256, such as the AFE 256 located with the ASR module 250.

The ASR module 250 converts the audio data 111 into text. The ASR module 250 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the utterance based on a similarity between the utterance and pre-established language models 254 stored in an ASR model knowledge base (i.e., ASR model storage 252). For example, the ASR module 250 may compare the audio data 111 with models for sounds (e.g., subword units or phonemes) and sequences of sounds to identify words that match the sequence of sounds spoken in the utterance of the audio data 111.

The different ways a spoken utterance may be interpreted (i.e., the different hypotheses) may each be assigned a probability or a confidence score representing a likelihood that a particular set of words matches those spoken in the utterance. The confidence score may be based on a number of factors including, for example, a similarity of the sound in the utterance to models for language sounds (e.g., an acoustic model 253 stored in the ASR model storage 252), and a likelihood that a particular word that matches the sounds would be included in the sentence at the specific location (e.g., using a language model 254 stored in the ASR model storage 252). Thus each potential textual interpretation of the spoken utterance (i.e., hypothesis) is associated with a confidence score. Based on the considered factors and the assigned confidence score, the ASR module 250 outputs the most likely text recognized in the audio data 111. The ASR module 250 may also output multiple hypotheses in the form of a lattice or an N-best list with each hypothesis corresponding to a confidence score or other score (e.g., such as probability scores, etc.).

The device or devices performing the ASR module 250 may include an AFE 256 and a speech recognition engine 258. The AFE 256 transforms the audio data 111, captured by the microphone 103, into data for processing by the speech recognition engine 160. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values (i.e., features) representing qualities of the audio data 111, along with a set of those values (i.e., a feature vector or audio feature vector) representing features/qualities of the audio data 111 within each frame. Many different features may be determined, as known in the art, and each feature represents some quality of the audio that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known skilled in the art.

The speech recognition engine 258 may process data output from the AFE 256 with reference to information stored in the ASR model storage 252. Alternatively, post front-end processed data (e.g., feature vectors) may be received by the device executing ASR processing from another source besides the internal AFE 256. For example, the device 110 may process audio data 111 into feature vectors (e.g., using an on-device AFE 256) and transmit that information to a server 120 across a network 199 for ASR processing. Feature vectors may arrive at the server 120 encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR module 250 will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing, such as conversion of the text into commands for execution, either by the device 110, by the server 120, or by another device (e.g., a server running a search engine, etc.)

The device performing NLU processing (e.g., the server 120) may include various components, including potentially dedicated processor(s), memory, storage, etc. The device performing NLU processing may include a dedicated NLU module/component 260, which may include a named entity recognition (NER) module 262, and intent classification (IC) module 264. The device performing NLU processing may additionally include NLU storage 273, and a knowledge base (not illustrated). The knowledge base is a database or other information storage that may include information about entities that may be used in resolving user utterances. The NLU module 260 may also utilize gazetteer information 284a-284n stored in an entity library storage 282. The knowledge base and/or gazetteer information 284a-284n may be used for entity resolution, for example matching ASR results with different entities (e.g., song titles, contact names, etc.). Gazetteers 284a-284n may be linked to users (e.g., a particular gazetteer may be associated with a specific user's music collection), may be linked to certain domains (e.g., shopping), or may be organized in a variety of other ways.

The NLU module 260 takes textual input (e.g., output from the ASR module 250 based on the utterance 11) and attempts to make a semantic interpretation of the text. That is, the NLU module 260 determines the meaning behind the text based on the individual words and then implements that meaning. The NLU module 260 interprets a text string to derive an intent or a desired action from the user as well as the pertinent pieces of information in the text that allow a device (e.g., the device 110, the server 120, etc.) to complete that action. For example, if a spoken utterance is processed using the ASR module 250, which outputs the text "call mom", the NLU module 260 may determine the user intended to activate a telephone in his/her device and to initiate a call with a contact matching the entity "mom."

The NLU module 260 may process several textual inputs related to the same utterance. For example, if the ASR module 250 outputs N text segments (e.g., as part of an N-best list), the NLU module 260 may process all N outputs to obtain NLU results.

As will be discussed further below, the NLU module 260 may be configured to parse and tag to annotate text as part of NLU processing. For example, for the text "call mom," "call" may be tagged as a command (e.g., to execute a phone call) and "mom" may be tagged as a specific entity and target of the command. In addition, the telephone number for the entity corresponding to "mom" stored in a contact list may be included in the annotated NLU results.

To correctly perform NLU processing of speech input, the NLU module 260 may be configured to determine a "domain" of the utterance so as to determine and narrow down which services offered by an endpoint device (e.g., the server 120 or the device 110) may be relevant. For example, an endpoint device may offer services relating to interactions with a telephone service, a contact list service, a calendar/scheduling service, a music player service, etc. Words in a single text utterance may implicate more than one service, and some services may be functionally linked (e.g., both a telephone service and a calendar service may utilize data from the contact list).

The NER module 262 receives an utterance in the form of ASR results and attempts to identify relevant grammars and lexical information that may be used to construe meaning. To do so, the NER module 262 may begin by identifying potential domains that may relate to the received utterance. The NLU storage 273 includes a database of domains 274a-274n associated with specific devices. For example, the device 110 may be associated with domains for music, telephony, calendaring, contact lists, and device-specific communications, but not video. In addition, the entity library 282 may include database entries about specific services on a specific device, either indexed by Device ID, User ID, Household ID, or some other indicator.

A domain may represent a discrete set of activities having a common theme, such as "shopping", "music", "calendaring", etc. As such, each domain may be associated with a particular language model and/or grammar database 276a-276n, a particular set of intents/actions 278a-278n, and/or a particular personalized lexicon 286. Each gazetteer 284a-284n may include domain-indexed lexical information associated with a particular user and/or device. For example, the Gazetteer A 284a includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

An utterance may be processed applying the rules, models, and information applicable to each identified domain. For example, if an utterance potentially implicates both communications and music, the utterance will be NLU processed using the grammar models and lexical information for communications, and will also be processed using the grammar models and lexical information for music. The responses to the utterance produced by each set of models is scored (as discussed further below), with the overall highest ranked result from all applied domains being ordinarily selected to be the correct result.

An IC module 264 parses the utterance to determine an intent(s) for each identified domain, where the intent(s) corresponds to the action to be performed that is responsive to the utterance. Each domain is associated with a database 278a-278n of words linked to intents. For example, a music intent database may link words and phrases such as "quiet," "volume off," and "mute" to a "mute" intent. The IC module 264 identifies potential intents for each identified domain by comparing words in the utterance to the words and phrases in the intents database 278.

In order to generate a particular interpreted response, the NER module 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model 276 associated with a shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar 276 framework(s) may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 262 may parse the utterance to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 262 then searches the corresponding fields in the domain-specific and personalized lexicon(s), attempting to match words and phrases in the utterance tagged as a grammatical object or object modifier with those identified in the database(s).

This process includes semantic tagging, which is the labeling of a word or combination of words according to their type/semantic meaning. Parsing may be performed using heuristic grammar rules, or the NER module 262 may be constructed using techniques such as hidden Markov models, maximum entropy models, log linear models, conditional random fields (CRF), and the like.

For instance, an utterance of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrases relate to the grammatical object of the utterance.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 262 may search the database of generic words associated with the domain (i.e., in the NLU storage 273). For instance, if the utterance was "play songs by the rolling stones," after failing to determine an album name or song name called "songs" by "the rolling stones," the NER module 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged utterance word or phrase, how closely the grammatical structure of the utterance corresponds to the applied grammatical framework, and based on whether the database indicates a relationship between an entry and information identified to fill other slots of the framework.

The NER module 262 may also use contextual operational rules to fill slots. For example, if a user had previously requested to pause a particular song and thereafter requested that the voice-controlled device "please un-pause my music," the NER module 262 may apply an inference-based rule to fill a slot associated with the name of the song that the user currently wishes to play—namely the song that was playing at the time the user requested to pause the music.

The results of NLU processing may be tagged to attribute meaning to the utterance. So, for example, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing, which may include tagged text, commands, etc., may then be sent to a command processor 290, which may be located on a same or separate server 120 as part of the system 100. The system 100 may include more than one command processor 290, and the command processor 290 may be determined based on the NLU output. For example, if the NLU output includes a command to play music, the command processor 290 selected may be a music playing application, such as one located on the device 110 or in a music playing appliance, configured to execute a music playing command. If the NLU output includes a search utterance (e.g., requesting the return of search results), the command processor 290 selected may include a search engine processor, such as one located on a search server, configured to execute a search command and determine search results, which may include output text to be processed by a TTS engine and output from a device as synthesized speech.

Figure 3:
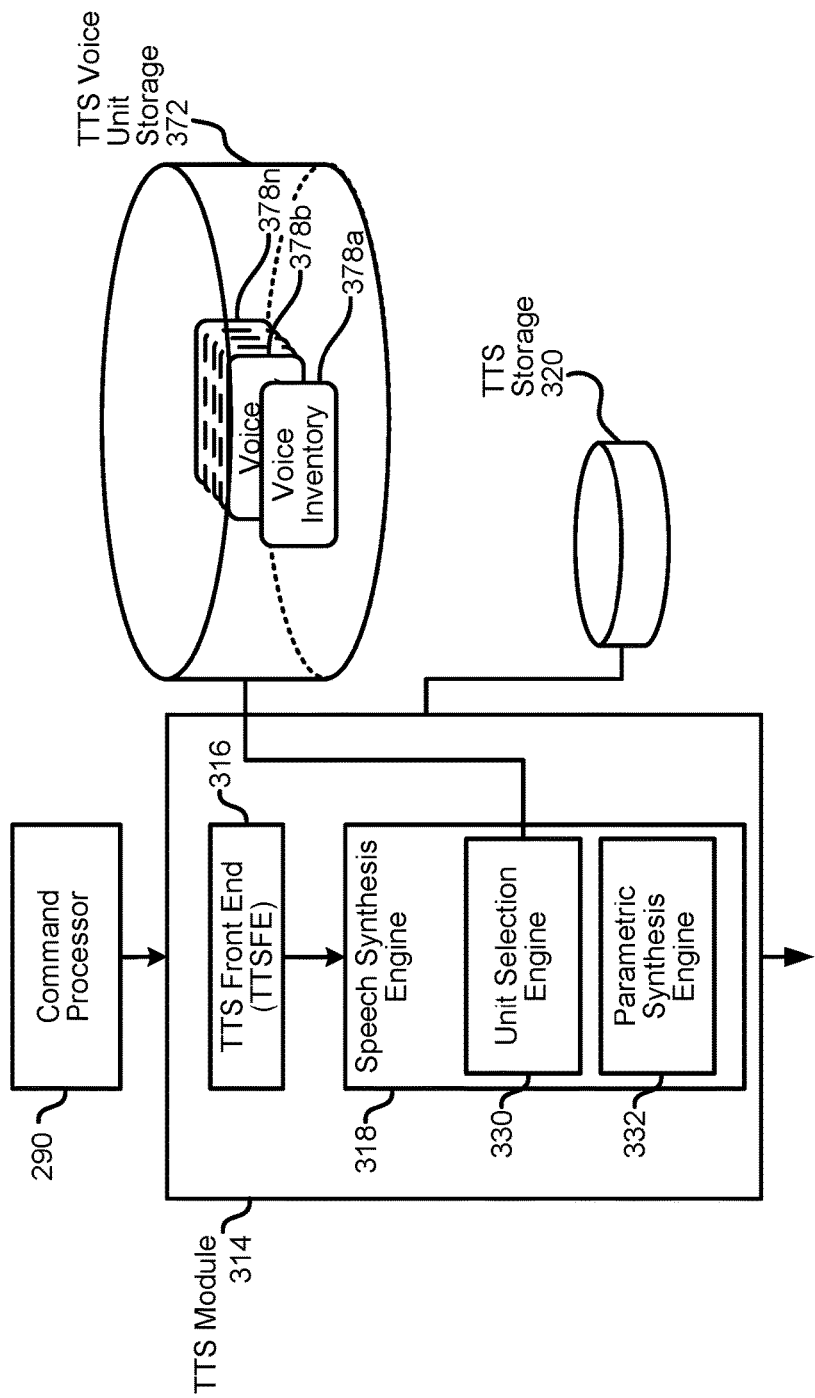
FIG. 3 is a conceptual diagram of how text-to-speech processing is performed according to embodiments of the present disclosure.

A TTS module 314 may receive tagged text data from the command processor 290, so the TTS module 314 may synthesize speech corresponding to the text data. Speech may be synthesized by the TTS module 314 as described below with respect to FIG. 3.

The TTS module/processor/component 314 includes a TTS front end (TTSFE) 316, a speech synthesis engine 318, and a TTS storage 320. The TTSFE 316 transforms input text data (e.g., from the command processor 290) into a symbolic linguistic representation for processing by the speech synthesis engine 318. The TTSFE 316 may also process tags or other data input to the TTS module 314 that indicate how specific words should be pronounced. The speech synthesis engine 318 compares the annotated phonetic units and information stored in the TTS storage 320 for converting the input text data into speech (i.e., audio data). The TTSFE 316 and the speech synthesis engine 318 may include their own controller(s)/processor(s) and memory, or they may use the controller/processor and memory of the server 120, the device 110, or another device, for example. Similarly, the instructions for operating the TTSFE 316 and the speech synthesis engine 318 may be located within the TTS module 314, within the memory and/or storage of the server 120, the device 110, or within an external device.

Text data input into the TTS module 314 may be sent to the TTSFE 316 for processing. The TTSFE 316 may include modules for performing text normalization, linguistic analysis, and linguistic prosody generation. During text normalization, the TTSFE 316 processes the input text data and generates standard/normalized text data, converting such things as numbers, abbreviations (e.g., Apt., St., etc.), and symbols ($, %, etc.) into the equivalent of written out words.

During linguistic analysis the TTSFE 316 analyzes language in the normalized text data to generate a sequence of phonetic units corresponding to the text data. This process may be referred to as phonetic transcription. Phonetic units include symbolic representations of sound units to be eventually combined and output by the system 100 as speech.

Various sound units may be used for dividing text data for purposes of speech synthesis. The TTS module 314 may process speech based on phonemes (i.e., individual sounds), half-phonemes, di-phones (i.e., the last half of one phoneme coupled with the first half of an adjacent phoneme), bi-phones (i.e., two consecutive phonemes), syllables, words, phrases, sentences, or other units. Each word may be mapped to one or more phonetic units. Such mapping may be performed using a language dictionary stored by the system 100, for example in the TTS storage 320. The linguistic analysis performed by the TTSFE 316 may also identify different grammatical components such as prefixes, suffixes, phrases, punctuation, syntactic boundaries, or the like. Such grammatical components may be used by the TTS module 314 to craft a natural sounding audio waveform output. The language dictionary may also include letter-to-sound rules and other tools that may be used to pronounce previously unidentified words or letter combinations that may be encountered by the TTS module 314. Generally, the more information included in the language dictionary, the higher quality the speech output.

Based on the linguistic analysis, the TTSFE 316 may then perform linguistic prosody generation where the phonetic units are annotated with desired prosodic characteristics, also called acoustic features, which indicate how the desired phonetic units are to be pronounced in the eventual output speech. During this stage the TTSFE 316 may consider and incorporate any prosodic annotations that accompanied the text data input to the TTS module 314. Such acoustic features may include pitch, energy, duration, and the like. Application of acoustic features may be based on prosodic models available to the TTS module 314. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information.

The output of the TTSFE 316, referred to as a symbolic linguistic representation, may include a sequence of phonetic units annotated with prosodic characteristics. This symbolic linguistic representation may be sent to the speech synthesis engine 318, also known as a synthesizer, for conversion into an audio waveform of speech for output to an audio output device and eventually to a user. The speech synthesis engine 318 may be configured to convert the input text data into high-quality natural-sounding speech in an efficient manner. Such high-quality speech may be configured to sound as much like a human speaker as possible, or may be configured to be understandable to a listener without attempts to mimic a precise human voice.

The speech synthesis engine 318 may perform speech synthesis using one or more different methods. In one method of synthesis called unit selection, described further below, a unit selection engine 330 matches the symbolic linguistic representation created by the TTSFE 316 against a database of recorded speech, such as a database of a voice corpus. The unit selection engine 330 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (e.g., its pitch, energy, etc.), as well as other information, such as where the phonetic unit appears in a word, sentence, or phrase, neighboring phonetic units, etc. Using all the information in the unit database, the unit selection engine 330 may match units to the input text data to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system 100 will be able to construct natural sounding speech.

In another method of synthesis, called parametric synthesis, parameters such as frequency, volume, and noise are varied by a parametric synthesis engine 332, a digital signal processor, or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio data output.

Parametric speech synthesis may be performed as follows. The TTS module 314 may include an acoustic model, or other models, which may convert a symbolic linguistic representation into a synthetic acoustic waveform of the input text data based on audio signal manipulation. The acoustic model includes rules which may be used by the parametric synthesis engine 332 to assign specific audio waveform parameters to input phonetic units and/or prosodic annotations. The rules may be used to calculate a score representing a likelihood that a particular audio output parameter(s) (e.g., frequency, volume, etc.) corresponds to the portion of the input symbolic linguistic representation received from the TTSFE 316.

The parametric synthesis engine 332 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (i.e., the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (e.g., phoneme identity, stress, accent, position, etc.). An initial determination of a probability of a potential phoneme may be associated with one state. As new text is processed by the speech synthesis engine 318, the state may change or stay the same, based on processing of the new text. For example, the pronunciation of a previously processed word might change based on later processed words. A Viterbi algorithm may be used to find the most likely sequence of states based on the processed text data. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, harmonic plus noise (HNM) based vocoders, code-excited linear prediction (CELP) vocoders, GlottHMM vocoders, harmonic/stochastic model (HSM) vocoders, or others.

For example, to create the customized speech output of the system 100, the system 100 may be configured with multiple voice inventories 378a-378n (stored in TTS voice unit storage 372), where each unit database is configured with a different "voice." Such voice inventories may also be linked to user accounts, discussed below. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual and recorded by the system 100. The TTS training utterances used to train a TTS voice corpus may be different from the training utterances used to train an ASR system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match a desired speech quality. The customized voice inventory 378 may then be used during runtime to perform unit selection to synthesize speech.

As an alternative to customized voice corpuses or customized parametric "voices," one or more filters may be used to alter traditional TTS output to match a desired speech quality (e.g., whisper, shout, etc.). For example, the TTS module 314 may synthesize speech as normal, but the system 100, either as part of the TTS module 314 or otherwise, may apply a filter to make the synthesized speech take on the desired speech quality. In this manner a traditional TTS output may be altered to take on the desired speech quality.

During runtime the TTS module 314 may receive text data for speech synthesis along with an indicator for a desired speech quality of the output speech. The TTS module 314 may then select a voice matching the speech quality, either for unit selection or parametric synthesis, and synthesize speech using the received text data and speech quality indicator.

Figure 4:
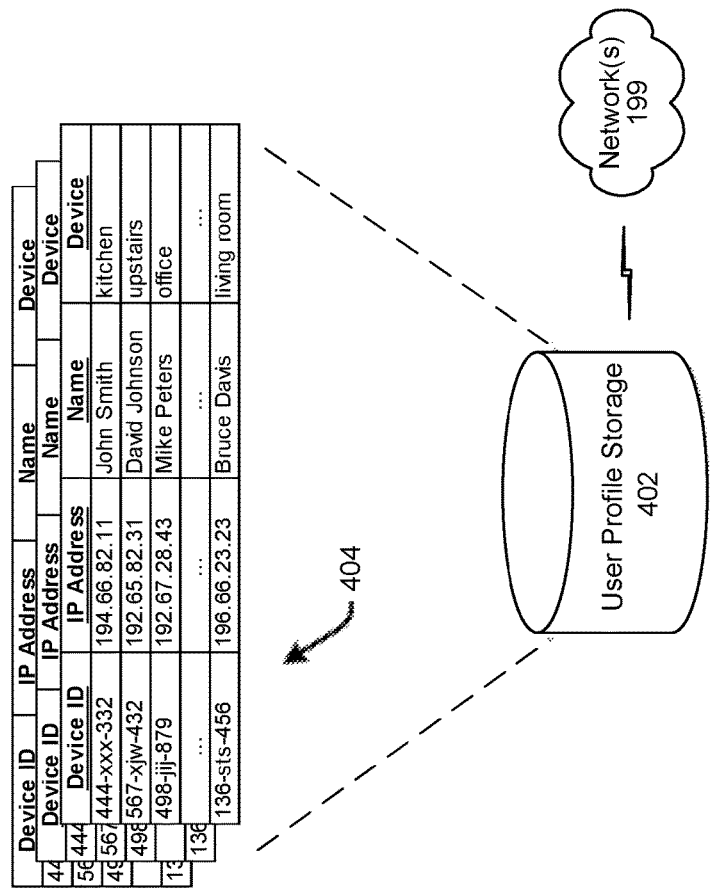
FIG. 4 illustrates data stored and associated with user profiles according to embodiments of the present disclosure.

FIG. 4 illustrates a user profile storage 402 that includes data regarding user accounts 404 as described herein. The user profile storage 402 may be located proximate to the server 120, or may otherwise be in communication with various components, for example over the network 199. The user profile storage 402 may include a variety of information related to individual users, accounts, etc. that interact with the system 100. For illustration, as shown in FIG. 4, the user profile storage 402 may include data regarding the devices associated with particular individual user accounts 404. In an example, the user profile storage 402 is a cloud-based storage. Each user profile 404 may include data such as device identifier (ID) data, internet protocol (IP) address data, name of device data, and location of device data for different devices. In addition, while not illustrated, each user profile 404 may include data regarding which applications the device is associated with (i.e., which applications the device is authorized to communication with via the server 120). Each user profile may also include data indicating languages spoken by a user, as well as an indication of a native language of the user. This may enable the system to train various components thereof with respect to accents (e.g., may enable the system to learn English spoken by a user having a native language of Spanish).

As discussed above, speech processing systems may typically be configured to recognize commands in a particular default format, such as "play music." Sometimes, however, users that are speaking to the system as deployed may request the system execute commands in a wide variety of sentence constructions, using idioms, slang, different languages, or a number of other utterance variations. Typically, the example utterances used to train a system do not cover the wide differences in phrasing that utterances may take with a system that is deployed and capable of processing utterances. To improve the system's response to such variations, the system may prompt the user, through a local device deployed in a typical speech processing environment, to speak a command to perform a specific function, and may store and process the user's response for further processing. By employing speech devices that typically receive user commands (such as a device 110 that may have been purchased by a user and installed in a user's home in a manner desired by the user), the system may be more likely to capture utterances as they would normally be spoken. Further, the device 110 may be a different device as used by the user, such as a smart watch 110c, tablet 110d, vehicle 110e, microphone array, or device capable of capturing speech, as discussed below for example in reference to FIG. 11.

Further, the type of prompt issued by the present system differs, for example, from the type of prompt a speech system may issue a user when the system wants to learn to understand the user's specific voice (sometimes called voice training). During voice training, the system may prompt the user to say specific text, which the system expects the user to repeat verbatim so that the system knows what the user sounds like when speaking certain words. In contrast, the present system does not prompt the user to say specific words, but rather prompts the user to speak a command in a phrasing of the user's choosing, which the system may then use to understand the phrasing of future commands by the user. Thus the prompts of the present system may be used to train NLU components rather than prompts to a user to repeat certain text verbatim which are used to train ASR components.

Figure 5:
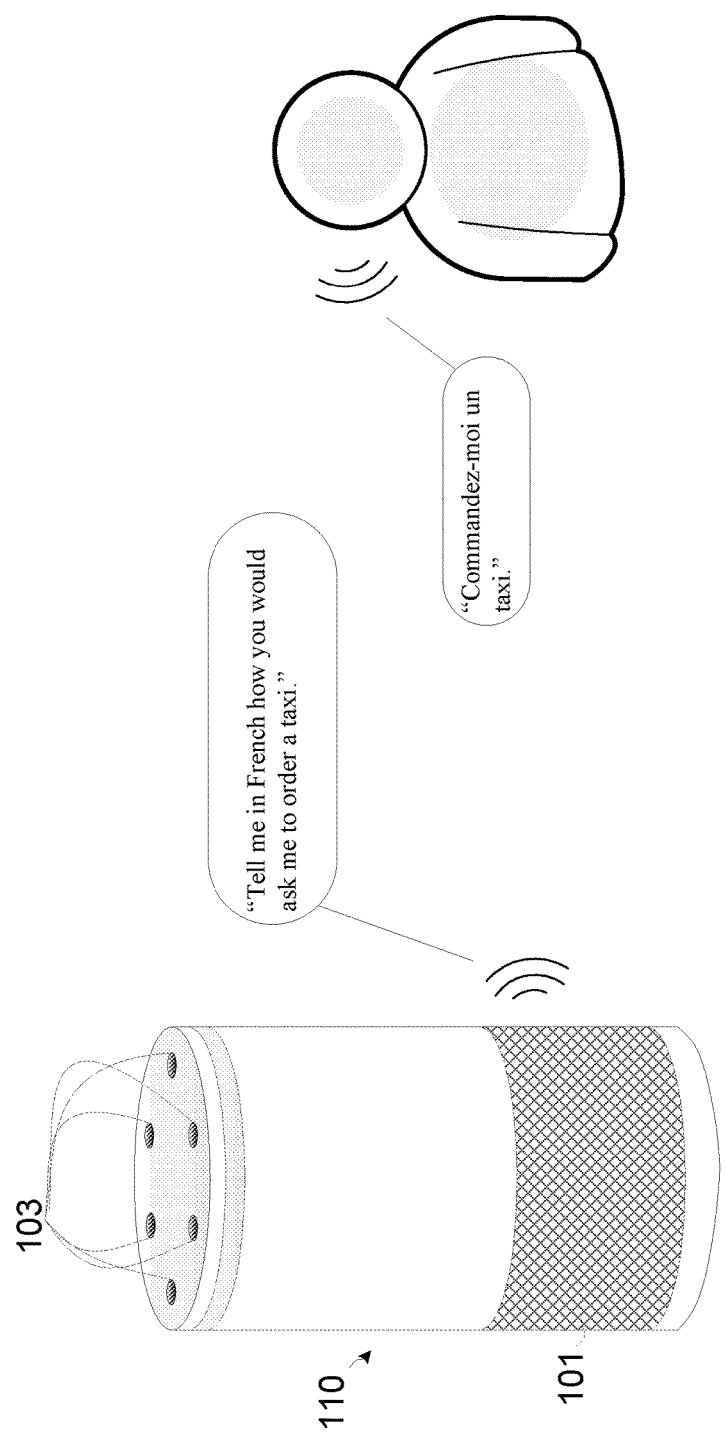
FIGS. 5 and 6 are illustrations of a speech-controlled device outputting audio corresponding to a prompt and receiving input audio in response to the prompt.
Figure 6:
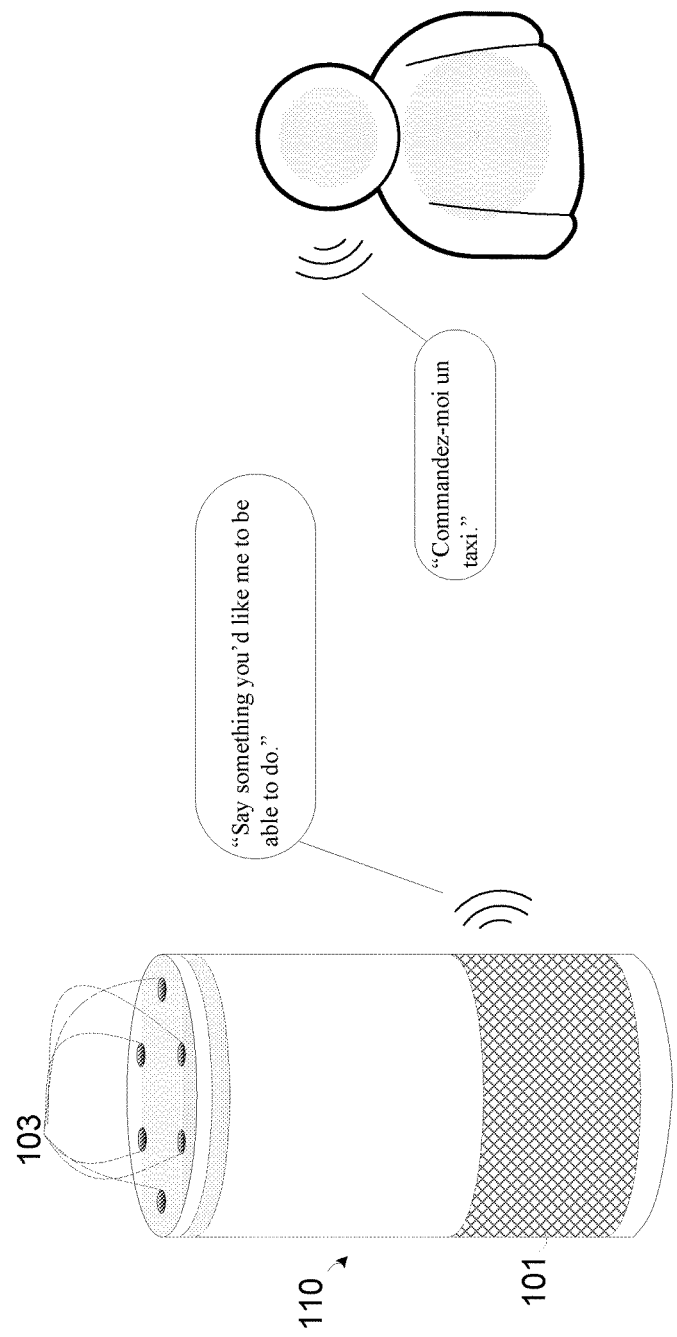

For example, FIG. 5 illustrates the system outputting a prompt for a user to order a taxi in French. The user responds, and the system may capture and process the utterance audio data and/or corresponding text data to train the system to recognize a command in French to order a taxi. In another example, FIG. 6 illustrates the system outputting a general prompt for the user to say something the system may train various components to learn how to do. The user responds, and the system may capture and process the utterance audio data and/or corresponding text data. The system may capture many of such prompted utterances and may build a collection of data that is captured from a real world deployment scenario, rather than from just training examples. The system may also employee various techniques to encourage users to provide such utterances such as incorporating the prompts into a game format, offering users incentives or rewards for providing the utterances, or the like.

FIGS. 7A and 7B illustrate the training of a NLU component of a speech processing system using solicited spoken utterances from a user, using certain components that would normally be used to process incoming commands. A device associated with an application (e.g., the application server 125) sends (702) text data to the server 120. The text data may be specific to a command that can be recognized/processed by the application server 125. For example, the text data may include indicators corresponding to the command and other text data that may be used to execute the command, such as "Play <Command> a movie <Content>", with <Command> and <Content> being indicators (i.e., representing "Play" as being a command and "movie" as being content corresponding to the command). The text data may be illustrative text that conforms to the server's default utterance structure. The server 120 uses (704) the received text data to train the NLU component regarding how utterances associated with a command of the application are spoken. That is, the server 120 may use the received text data to train the NLU component to determine characteristics of input audio data representing utterances triggering the command. According to the above example, the NLU component would be trained to recognize the spoken utterance "Play a movie" as being a command for the server 120 to communicate with the application server 125 regarding the movie. Thus, one skilled in the art should appreciate that the text data provided by the application server 125 may be used to form a default utterance structure for the particular command, which the server 120 uses for determining whether future spoken utterances relate to the command. That is, the system may take the text data received by the application server 125 and train speech processing components, such as an NLU component or one or more rules, to recognize incoming text in a specific form invoking the command, as an utterance intended to launch the command (for example using application server 125).

Training a machine learning component such as, in this case, the NLU component, requires establishing a "ground truth" for training examples. In machine learning, the term "ground truth" refers to the accuracy of a training set's classification for supervised learning techniques. For example, known types for previous utterances may be used as ground truth data for the training set used to train the NLU component. Various techniques may be used to train the NLU component including backpropagation, statistical learning, supervised learning, semi-supervised learning, stochastic learning, stochastic gradient descent, or other known techniques. Thus, many different training examples may be used to train the NLU component discussed herein. Further, as training data is added, or otherwise changed, the NLU component may be trained to update accordingly. It should be appreciated that indicators regarding language fluency and accents may be used to train the NLU component based on speaker ID. For example, the system may know a native language of the user, and therefrom may train the NLU component regarding accents of the user when the user speaks to the system in the non-native language. It should also be appreciated that use of user data according to the present disclosure may be performed only after obtaining user permission, and that measures may be taken to ensure the privacy of such user data. Permission to use user data according to the teachings of the present disclosure may be indicated in user profiles as described herein.

The server 120 may generate (706) prompt text data soliciting a spoken utterance that a user intends to be recognized by the NLU component as the command of the application. The server 120 may also or alternatively generate prompt visual data (e.g., image or video data), along with text data soliciting a spoken utterance regarding how the user would refer to a representation in the visual data. For example, the prompt text data may state "Tell me how you would request a movie to be played from [Content Source]." The server 120 may perform (708) TTS processing on the prompt text data to create computer-generated prompt audio data. The server 120 may then send (710) a signal including the prompt audio data to a speech-controlled device 110.

The speech-controlled device 110 outputs (712 illustrated in FIG. 7B) audio including at least a portion corresponding to the prompt audio data. The speech-controlled device 110 thereafter captures (714) spoken audio, and sends (716) input audio data corresponding to the captured spoken audio to the server 120.

The server 120 performs (718) ASR on the received input audio data to create text data. If the system does not have a model configured to convert received audio data into text data, the text data may be created manually by a human. The server 120 uses (720) the text data to train the NLU component regarding how utterances associated with the command of the application are spoken (i.e., train the NLU component to determine updated characteristics of input audio data representing utterances triggering the command). That is, the text data may be used to train the NLU component to refine the default utterance structure of the utterance that triggers the command associated with the application to be more accurate in view of commonplace user speech patterns.

FIGS. 8A through 8F illustrate the training of a NLU component of a speech processing system using spoken utterances. A device associated with an application (e.g., the application server 125) sends (702) text data to the server 120. For example, the text data may state "Play <Command> a movie <Content>". The server 120 may identify (802) an indicator and associated command text data in the text data received from the application server 125.

According to the aforementioned example, the indicator may be "<PlayVideo>" and the associated command text data may be "Play". The server 120 may also identify (804) a second indicator and associated content/content type text data in the text data received from the application server 125. According to the aforementioned example, the second indicator may be "<MovieTitle>" and the associated content/content type text data may be "movie." The server 120 uses (806) the first indicator, the command text data, the second indicator, and/or the content/content type text data to train the NLU component regarding how utterances associated with a command of the application are spoken.

The server 120 may generate (706 illustrated in FIG. 8B) prompt text data soliciting a spoken utterance that a user intends to be recognized by the NLU component as the command of the application. For example, the prompt text data may include "tell me how you would like to command the system to play a movie." The server 120 may also determine (808) a speech-controlled device 110, using user profiles, associated with the application. For example, the server 120 may access user profiles including data of speech-controlled devices, and determine which user profiles include data authorizing communication with the application server 125 associated with the application. If multiple user profiles include data authorizing communication with the application server 125 are determined, the server 120 may select a user profile at random, or may select a user profile using other means known to those skilled in the art. The server 120 may then send (810) a signal, to the speech-controlled device 110 associated with the selected user profile, including the prompt text data.

The speech-controlled device 110 outputs (812) audio including at least a portion corresponding to the prompt text data. The speech-controlled device 110 thereafter captures (714) spoken audio, and sends (716 illustrated in FIG. 8C) input audio data corresponding to the captured spoken audio to the server 120.

The server 120 performs (814) ASR processing on the received input audio data to create text data. The server 120 may also associate (816) the created text data with a speaker ID corresponding to the user that spoke the utterance. By associating the text data with a speaker ID, the NLU component is able to adjust how utterances for commands are spoken on a user by user level. The server 120 may also determine (818) a portion of the text data corresponding to command text data, and associate (820) that portion of the text data with a command text data indicator. For example, if the utterance input audio data was processed into text data corresponding to "show me ghostbusters" the server 120 may determine "show" as the portion of the text data, and may associate "show" with the command text data indicator <PlayMovie>. The server 120 may also determine (822 illustrated in FIG. 8D) a different portion of the text data corresponding to content/content type text data, and associate (824) that portion of the text data with a content/content type text data indicator. For example, the server 120 may determine "ghostbusters" as the portion of the text data, and may associate "ghostbusters" with the content/content type text data indicator <MovieTitle>. The server 120 may then use (826) the portion of the text data corresponding to the command, the command text data indicator, the portion of the text data corresponding to the content/content type, and the content/content type text data indicator to train the NLU component regarding how utterances associated with the command of the application are spoken. While it has been described that a user may be prompted to speak an utterance regarding a command of a particular application, one skilled in the art should appreciate that the spoken utterance may be used to train the NLU component regarding the particular application as well as a different application associated with a similar command.

The system 100 may also be configured to receive feedback from a user regarding previous training of the NLU component, and use the feedback to further train the NLU component. To perform such, the server 120, after training the NLU component using the previously spoken utterance, may process the spoken utterance to determine a command and content. The server 120 may then send (828 illustrated in FIG. 8E) a signal including a request for the content to the application server 125, and receive (830) the content from the application server 125. It should be appreciated that the server 120 may sent the signal to the application server 125 after the server 120 trains the NLU component. By timing transmission of the signal as such, the user feedback described below is more accurate than if the signal was sent pre-training of the NLU component. The server 120 may then send (832) a signal including the content and a request for feedback to the speech-controlled device 110. The feedback sought may correspond to a correctness of the content provided with respect to the content represented in the previously spoken utterance. While it has been described that the signal including the content and the request for feedback may be sent to the same speech-controlled device 110 from which the original spoken utterance was received, one skilled in the art should appreciate that the signal may be sent to a different device associated with the same user profile as the speech-controlled device 110.

The speech-controlled device 110 outputs (834) the content. The speech-controlled device 110 also outputs (836) audio including at least a portion corresponding to the request for feedback. For example, the audio may state "Is the content I provided the content you requested?" Thereafter, the speech-controlled device 110 captures (838) second input audio, and sends (840) second input audio data corresponding to the capture audio to the server 120.

The server 120 performs (842 illustrated in FIG. 8F) speech processing (e.g., ASR) on the received audio data, and determines (844) a correctness of the provided content. The server 120 then uses (844) the determined correctness to further train the NLU component regarding how utterances associated with the command of the application are spoken.

Figure 9:
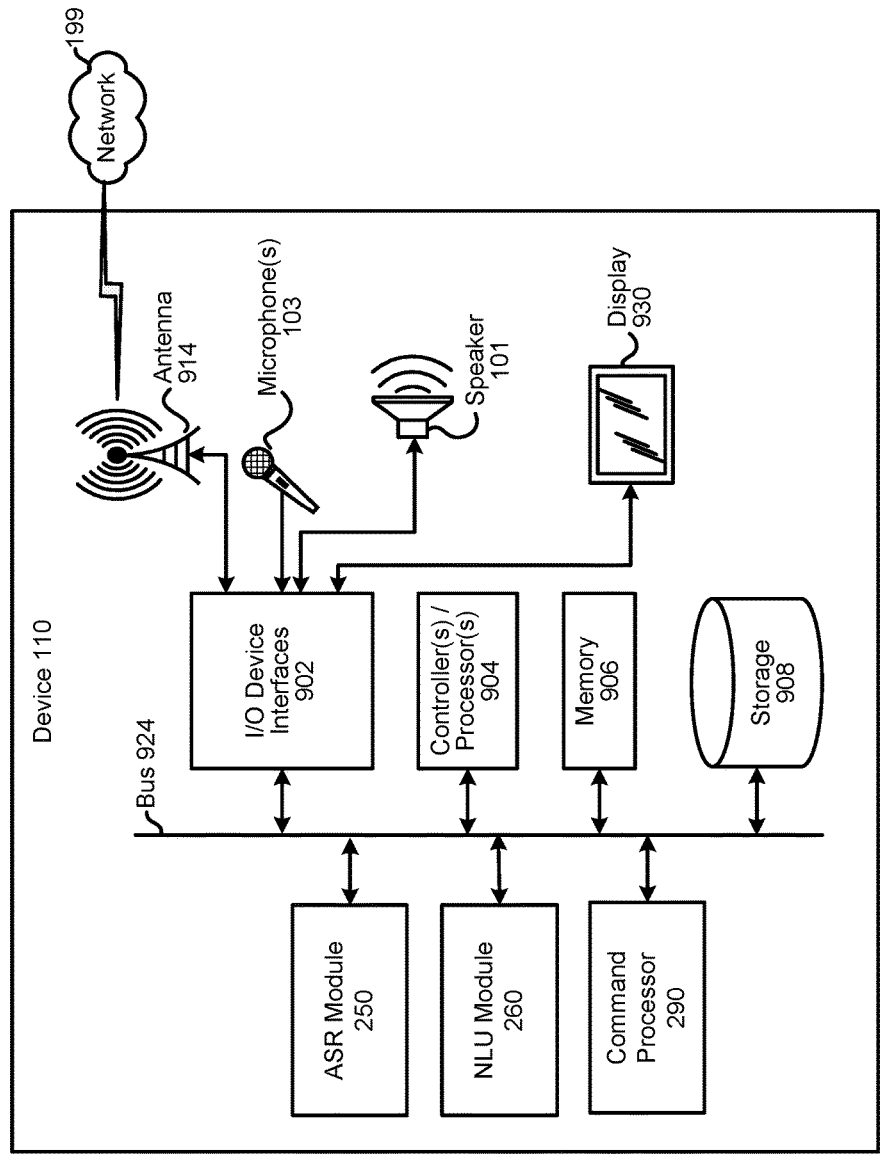
FIG. 9 is a block diagram conceptually illustrating example components of speech-controlled devices according to embodiments of the present disclosure.
Figure 10:
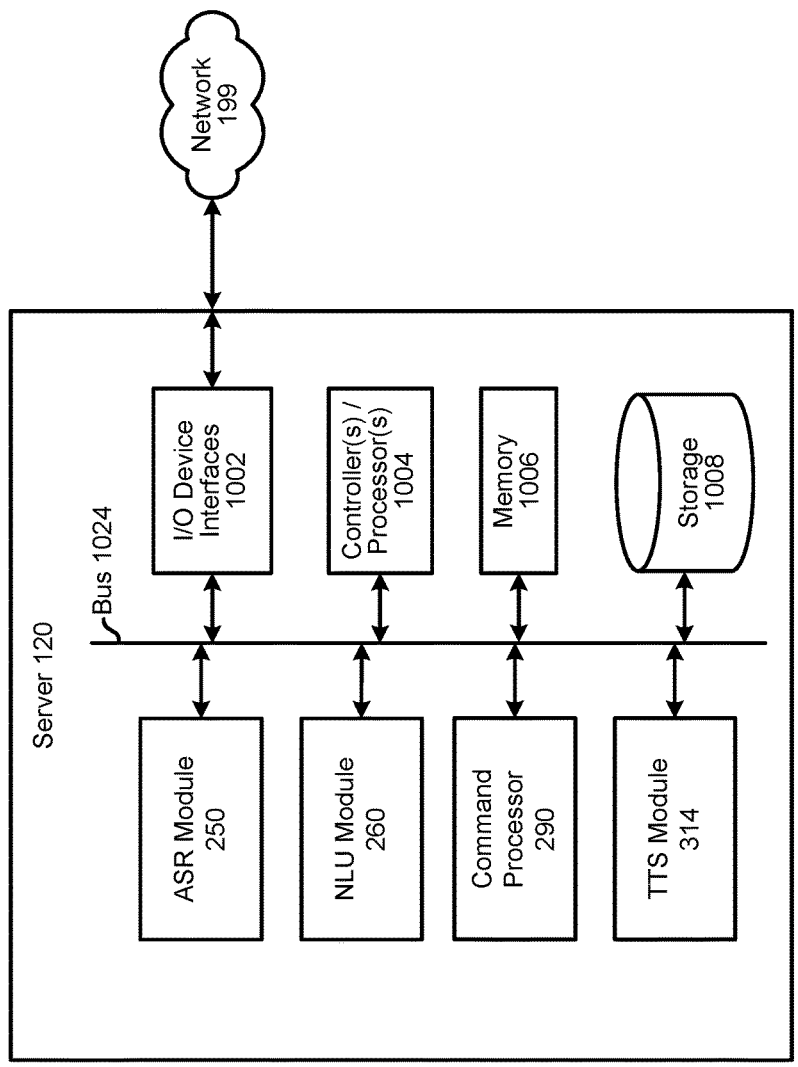
FIG. 10 is a block diagram conceptually illustrating example components of a server according to embodiments of the present disclosure.

FIG. 9 is a block diagram conceptually illustrating a user device 110 (e.g., the speech-controlled device 110 described herein) that may be used with the described system. FIG. 10 is a block diagram conceptually illustrating example components of a remote device, such as the server 120 that may assist with ASR processing, NLU processing, or command processing. Multiple servers 120 may be included in the system, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (904/1004), that may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive (MRAM) and/or other types of memory. Each device (110/120) may also include a data storage component (908/1008), for storing data and controller/processor-executable instructions. Each data storage component may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (902/1002).

Computer instructions for operating each device (110/120) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120) includes input/output device interfaces (902/1002). A variety of components may be connected through the input/output device interfaces (902/1002), as will be discussed further below. Additionally, each device (110/120) may include an address/data bus (924/1024) for conveying data among components of the respective device. Each component within a device (110/120) may also be directly connected to other components in addition to (or instead of) being connected to other components across the bus (924/1024).

Referring to the device 110 of FIG. 9, the device 110 may include input/output device interfaces 1302 that connect to a variety of components such as an audio output component such as a speaker 101, a visual output component such as a display 930, a wired headset or a wireless headset (not illustrated), or other component capable of outputting audio. The display 930 may output image and/or video data described herein. The device 110 may also include an audio capture component. The audio capture component may be, for example, a microphone 103 or array of microphones, a wired headset or a wireless headset (not illustrated), etc. The microphone 103 may be configured to capture audio. If an array of microphones is included, approximate distance to a sound's point of origin may be determined by acoustic localization based on time and amplitude differences between sounds captured by different microphones of the array.

For example, via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or the server 120 may include an ASR module 250. The ASR module 250 in device 110 may be of limited or extended capabilities. The ASR module 250 may include the language models 254 stored in ASR model storage component 252. If limited speech recognition is included, the ASR module 250 may be configured to identify a limited number of words, whereas extended speech recognition may be configured to recognize a much larger range of words.

The device 110 and/or the server 120 may include a limited or extended NLU module 260. The NLU module 260 in device 110 may be of limited or extended capabilities. The NLU module 260 may comprise the name entity recognition module 262, the intent classification module 264, and/or other components. The NLU module 260 may also include a stored knowledge base and/or entity library, or those storages may be separately located.

The device 110 and/or the server 120 may also include the command processor 290 configured to execute commands/functions associated with a spoken utterance as described above.

As noted above, multiple devices may be employed in a single speech processing system. In such a multi-device system, each of the devices may include different components for performing different aspects of the speech processing. The multiple devices may include overlapping components. The components of the device 110 and the server 120, as illustrated in FIGS. 9 and 10, are exemplary, and may be located as a stand-alone device or may be included, in whole or in part, as a component of a larger device or system.

To create output speech, the server 120 may be configured with the TTS module 314 described in detail herein above.

As illustrated in FIG. 11 multiple devices (120, 110, 110a-110e) may contain components of the system 100 and the devices may be connected over a network 199. The network 199 may include a local or private network or may include a wide network such as the Internet. Devices may be connected to the network 199 through either wired or wireless connections. For example, the speech-controlled device 110, a tablet computer 110d, a smart phone 110b, a smart watch 110c, and/or a vehicle 110e may be connected to the network 199 through a wireless service provider, over a WiFi or cellular network connection, or the like. Other devices are included as network-connected support devices, such as the server 120, application developer devices (e.g., the application server 125), or others. The support devices may connect to the network 199 through a wired connection or wireless connection. Networked devices may capture audio using one-or-more built-in or connected microphones 103 or audio capture devices, with processing performed by ASR, NLU, or other components of the same device or another device connected via the network 199, such as the ASR module 250, the NLU module 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 256, which comprises, among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
    receiving, from a server associated with an application, a first indicator representing an intent to invoke the application;
    receiving, from the server, a second indicator representing a content type, the content type corresponding to content accessible by the application;
    using the first indicator and the second indicator to train a natural language understanding (NLU) component of a system;
    generating output audio data soliciting a spoken utterance, wherein the output audio data represents the intent and the content type;
    causing a first device to output first audio corresponding to the output audio data;
    receiving, from the first device, first input audio data;
    performing automatic speech recognition (ASR) processing on the first input audio data to generate first text data, the first text data including a first portion and a second portion;
    associating the first portion with the first indicator;
    associating the second portion with the second indicator;
    using the first portion associated with the first indicator and the second portion associated with the second indicator to further train the NLU component;
    after further training the NLU component, determining, using the NLU component, that a user input corresponds to the intent and the content type; and
    causing the application to perform an action based at least in part on determining that the user input corresponds to the intent and the content type.

2. The computer-implemented method of claim 1, further comprising:
    causing a second device to output second audio representing the output audio data;
    receiving, from the second device, second input audio data;
    performing ASR processing on the second input audio data to create second text data, the second text data including a third portion and a fourth portion;
    associating the third portion with the first indicator;
    associating the fourth portion with the second indicator; and
    using the third portion associated with the first indicator and the fourth portion associated with the second indicator to further train the NLU component.

3. The computer-implemented method of claim 1, wherein:
    the first indicator and the second indicator correspond to a first language;
    the output audio data solicits the spoken utterance in a second language; and
    the method further comprising:
        associating at least a portion of the first text data with a third indicator corresponding to the second language; and
        using the at least a portion of the first text data associated with the third indicator to train a second NLU component.

4. A system, comprising:
    at least one processor; and
    at least one memory including instructions that, when executed by the at least one processor, cause the system to:
        determine user profile data associated with a device;
        determine, in the user profile data, a first language spoken by a user associated with the user profile data;
        cause the device to output first audio, in the first language, soliciting a spoken utterance in a second language, wherein the first audio includes a first indicator representing an intent and a second indicator representing a content type;

receive, from the device, audio data corresponding to an utterance in the second language;

perform automatic speech recognition (ASR) processing on the audio data to generate text data, the text data including a first portion and a second portion;

associate the first portion with the first indicator;

associate the second portion with the second indicator;

generate a third indicator representing the text data corresponds to the second language;

use the first portion associated with the first indicator, the second portion associated with the second indicator, and the third indicator to train a natural language understanding (NLU) component corresponding to the second language;

after training the NLU component, determine, using the NLU component, that a user input corresponds to the intent and the content type; and cause an application to perform an action based at least in part on determining that the user input corresponds to the intent and the content type.

5. The system of claim 4, wherein the at least one memory further includes instructions that, when executed by the at least one processor, further cause the system to:

associate the audio data with a user identifier, the user identifier representing a user that spoke a first utterance represented in the audio data; and use the first portion associated with the first indicator and the second portion associated with the second indicator to train the NLU component with respect to the user identifier.

6. The system of claim 4, wherein the at least one memory further includes instructions that, when executed by the at least one processor, further cause the system to:

generate second text data soliciting the spoken utterance; and perform text-to-speech (TTS) processing on the second text data to create first output audio data, wherein the first audio corresponds to the first output audio data.

7. The system of claim 4, wherein the at least one memory further includes instructions that, when executed by the at least one processor, further cause the system to:

send, to at least one server, a request for content, the content being represented in the second portion;

receive, from the at least one server, content data;

send, to the device, the content data;

send, to the device, a request for feedback indicating a correctness of the content data;

receive, from the device, second audio data;

perform speech processing on the second audio data to determine a correctness of the content data; and use the correctness to train the NLU component.

8. The system of claim 4, wherein the at least one memory further includes instructions that, when executed by the at least one processor, further cause the system to:

send, to the device, visual data; and cause the device to output second audio soliciting a second spoken utterance regarding a representation in the visual data.

9. The system of claim 4, wherein the at least one memory further includes instructions that, when executed by the at least one processor, further cause the system to:

determine first data needed to execute with respect to the intent; and cause the device to output second audio soliciting a second spoken utterance representing the first data.

10. The system of claim 9, wherein the at least one memory further includes instructions that, when executed by the at least one processor, further cause the system to:

receive, from the device, second audio data;

perform ASR processing on the second audio data to generate second text data; and use the second text data to train the NLU component.

11. A computer-implemented method, comprising:

determining user profile data associated with a device;

determining, in the user profile data, a first language spoken by a user associated with the user profile data;

causing the device to output first audio, in the first language, soliciting a spoken utterance in a second language, wherein the first audio includes a first indicator representing an intent and a second indicator representing a content type;

receiving, from the device, audio data corresponding to an utterance in the second language;

performing automatic speech recognition (ASR) processing on the audio data to generate text data, the text data including a first portion and a second portion;

associating the first portion with the first indicator;

associating the second portion with the second indicator;

generating a third indicator representing the text data corresponds to the second language;

using the first portion associated with the first indicator, the second portion associated with the second indicator, and the third indicator to train a natural language understanding (NLU) component corresponding to the second language;

after training the NLU component, determining, using the NLU component, that a user input corresponds to the intent and the content type; and causing an application to perform an action based at least in part on determining that the user input corresponds to the intent and the content type.

12. The computer-implemented method of claim 11, further comprising:

associating the audio data with a user identifier, the user identifier representing a user that spoke a first utterance represented in the audio data; and using the first portion associated with the first indicator and the second portion associated with the second indicator to train the NLU component with respect to the user identifier.

13. The computer-implemented method of claim 11, further comprising:

generating second text data soliciting the spoken utterance; and performing text-to-speech (TTS) processing on the second text data to create first output audio data, wherein the first audio corresponds to the first output audio data.

14. The computer-implemented method of claim 11, further comprising:

sending, to at least one server, a request for content, the content being represented in the second portion;

receiving, from the at least one server, content data;

sending, to the device, the content data;

sending, to the device, a request for feedback indicating a correctness of the content data;

receiving, from the device, second audio data;

performing speech processing on the second audio data to determine a correctness of the content data; and using the correctness to train the NLU component.

15. The computer-implemented method of claim 11, further comprising:

sending, to the device, visual data; and
causing the device to output second audio soliciting a second spoken utterance regarding a representation in the visual data.

16. The computer-implemented method of claim 11, further comprising:
determining first data needed to execute with respect to the intent; and
causing the device to output second audio soliciting a second spoken utterance representing the first data.

17. The computer-implemented method of claim 16, further comprising:
receiving, from the device, second audio data;
performing ASR processing on the second audio data to generate second text data; and
using the second text data to train the NLU component.

* * * * *